United States Patent
Goshen

(10) Patent No.: US 12,511,718 B2
(45) Date of Patent: Dec. 30, 2025

(54) CONTRAST BOOST BY MACHINE LEARNING

(71) Applicant: KONINKLIJKE PHILIPS N.V., Eindhoven (NL)

(72) Inventor: Liran Goshen, Pardes-Hanna (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 314 days.

(21) Appl. No.: 18/276,677

(22) PCT Filed: Feb. 14, 2022

(86) PCT No.: PCT/EP2022/053452
§ 371 (c)(1),
(2) Date: Aug. 10, 2023

(87) PCT Pub. No.: WO2022/171845
PCT Pub. Date: Aug. 18, 2022

(65) Prior Publication Data
US 2024/0311974 A1    Sep. 19, 2024

(30) Foreign Application Priority Data
Feb. 15, 2021 (EP) .................. 21157112

(51) Int. Cl.
*G06T 5/60* (2024.01)
*G06T 5/70* (2024.01)
*G06T 5/94* (2024.01)

(52) U.S. Cl.
CPC ............. *G06T 5/60* (2024.01); *G06T 5/70* (2024.01); *G06T 5/94* (2024.01);
(Continued)

(58) Field of Classification Search
None
See application file for complete search history.

(56) References Cited

U.S. PATENT DOCUMENTS 8,938,110 B2    1/2015    Goshen
9,159,124 B2    10/2015    Goshen
(Continued)

FOREIGN PATENT DOCUMENTS

EP    3576050 A1    12/2019
EP    3731144 A1    10/2020
(Continued)

OTHER PUBLICATIONS

PCT International Search Report, International application No. PCT/EP2022/053452, Jun. 21, 2022 .
(Continued)

*Primary Examiner* — David Ometz
(74) *Attorney, Agent, or Firm* — Larry Liberchuk

(57) ABSTRACT

A training system for a target machine learning model for image enhancement and related methods. The system has a framework of two machine learning models (G1, G2) of the generative type, one such model (G1) being part of the target machine learning model. The training is based on a training data set including at least two types of training imagery, high image quality (IQ) imagery and low IQ imagery, the training input image being one of the high IQ type. The generative network (G1) processes the training input image of the high IQ type to produce a training output image having reduced IQ. The target machine learning model further produces, based on the training output image having the reduced IQ and the training input image of the high IQ type, a second training output image. The second generator network (G2) estimates, from the second training output image, an estimate of the training input image of the high IQ type. A training controller adjusts parameters of the machine learning model framework, based on a deviation between the estimate of the training input image of the high IQ type and the training input image of the high IQ type.

11 Claims, 7 Drawing Sheets

(52) U.S. Cl.
CPC .............. *G06T 2207/10081* (2013.01); *G06T 2207/10088* (2013.01); *G06T 2207/10116* (2013.01); *G06T 2207/20081* (2013.01); *G06T 2207/20084* (2013.01); *G06T 2207/30004* (2013.01)

(56) References Cited

U.S. PATENT DOCUMENTS

| | | | |
|---|---|---|---|
| 9,547,889 | B2 | 1/2017 | Goshen |
| 10,282,820 | B2 | 5/2019 | Goshen |
| 2019/0108634 | A1 | 4/2019 | Zaharchuk |
| 2019/0333199 | A1 | 10/2019 | Ozcan |
| 2020/0111194 | A1 | 4/2020 | Wang |
| 2020/0372301 | A1 | 11/2020 | Kearney |

FOREIGN PATENT DOCUMENTS

| | | |
|---|---|---|
| EP | 3739522 A1 | 11/2020 |
| WO | WO20200234051 A1 | 11/2020 |

OTHER PUBLICATIONS

Zeiler M. D. et al., "Adaptive Deconvolutional Networks for Mid and High Level Feature Learning", 2011 International Conference on Computer Vision, Barcelona, Spain, pp. 2018-2025, 2011.

Goshen L. et al., "An Iodine-Calcium Separation Analysis and Virtually Non-Contrasted Image Generation Obtained with Single Source Dual Energy MDCT", 2008 IEEE Nuclear Science Symposium Conference Record, pp. 3868-3870, Oct. 2008.

Ioffe S. et al., "Batch Normalization: Accelerating Deep Network Training by Reducing Internal Covariate Shift", online TarXiv:1502. 03167v3 [cs.LG] Mar. 2, 2015.

Li S. et al., "Pixel-Level Image Fusion: A Survey of the State of the Art", Information Fusion, Elsevier, US, vol. 33, May 19, 2016, pp. 100-112, XP029596965.

Maayan F-A et al., "GAN-Based Synthetic Medical Image Augmentation for increased CNN Performance in Liver Lesion Classification", arxiv.org, Cornell University Library, 201 Olin Library Cornell University Ithaca, Ny 14853, Mar. 3, 2018, XP081134953.

Yi X. et al., "Generative Adversarial Network in Medical Imaging: A Review", arXiv:1809.07294v4 [cs.CV] , Sep. 2019.

Tang Y. et al., "CT Image Enhancement Using Stacked Generative Adversarial Networks and Transfer Learning for Lesion Segmentation Improvement", arXiv:1807.07144v1 [cs.CV], Jul. 18, 2018.

Dar S.H. et al., "Image Synthesis in Multi-Contrast MRI with Conditional Generative Adversarial Networks", arXiv:1802.01221, Feb. 2018.

Armanious K. et al., "MedGAN: Medical Image Translation Using GANs", arXiv:1806.06397v2 [cs.CV] , Apr. 4, 2019.

Wang C.L. et al., "Frequency, Outcome, and Appropriateness of Treatment of Nonionic Iodinated Contrast Media Reactions", AJR American Journal of Roentgenology, vol. 191, No. 2, pp. 409-415 , Aug. 2008.

Mortele K.J. et al., "Universal Use of Nonionic Iodinated Contrast Medium for CT: Evaluation of Safety in a Large Urban Teaching Hospital", AJR American Journal of Roentgenology, vol. 184, Issue 1, pp. 31-34, 2005.

Wong P.C.Y. et al., "Pathophysiology of Contrast-Induced Nephropathy", International Journal of Cardiology, vol. 158, Issue 2, pp. 186-192, Jul. 2, 2012.

Wong G.T.C. et al., "Contrast-Induced Nephropathy", British Journal of Anesthesia (BJA), vol. 99, Issue 4, pp. 474-483, 2007.

Solomon R. et al., "Follow-Up of Patients with Contrast Induced Nephropathy", Kidney International Suppl, vol. 100, pp. S46-S50, 2006.

Barrett B.J. et al., "Preventing Nephropathy Induced by Contrast Medium", New England Journal of Medicine, vol. 354, pp. 379-386, Clinical Practice, 2006.

Barrett B.J. et al., "Contrast Induced Nephropathy in Patients with Chronic Kidney Disease Undergoing Computed Tomography: A Double-Blind Comparison of Iodixanol and Iopamidol", Investigative Radiology, vol. 41, No. 11, pp. 815-821, Nov. 2006.

Nash K. et al., "Hospital-Acquired Renal Insufficiency", American Journal of Kidney Diseases, vol. 39, No. 5, pp. 930-936, 2002.

Kobayashi K. et al., "Screening Methods for Early Detection of Hepatocellular Carcinoma", Hepatology, vol. 5 Issue 6, pp. 1100-1105, 1985.

De Ledinghen V. et al., "Detection of Nodules in Liver Cirrhosis: Spiral Computed Tomography or Magnetic Resonance Imaging? A Prospective Study of 88 Nodules in 34 Patients", European Journal of Gastroenterology & Hepatology, vol. 14, No. 2, pp. 159-165, 2002.

Napel S. et al., "CT Angiography with Spiral CT and Maximum Intensity Projection", Radiology, vol. 185, No. 2, pp. 607-610, 1992.

Marks M.P. et al., "Diagnosis of Carotid Artery Disease: Preliminary Experience with Maximumintensity-Projection Spiral CT Angiography", AJR American Journal of Roentgenology, 160(6):1267-1271, 1993.

Diederichs C.G. et al., "Blurring of Vessels in Spiral CT Angiography: Effects of Collimation Width, Pitch, Viewing Plane, and Windowing in Maximum Intensity Projection", Journal of Computer Assisted Tomography, 20(6):965-97, Nov. 1996.

Jeon Y.W. et al., "Dynamic CT Perfusion Imaging for the Detection of Crossed Cerebellar Diaschisis in Acute Ischemic Stroke", Korean Journal of Radiology, vol. 13, No. 1, pp. 12-19, 2012.

Lin K., et al., "Measuring Elevated Microvascular Permeability and Predicting Hemorrhagic Transformation in Acute Ischemic Stroke Using First-Pass Dynamic Perfusion CT Imaging", AJNR American Journal of Neuroradiology, vol. 28, No. 7, pp. 1292-1298, 2007.

Eastwood J.D. et al., "Correlation of Early Dynamic CT Perfusion Imaging with Whole-Brain MR Diffusion and Perfusion Imaging in Acute Hemispheric Stroke", AJNR American Journal of Neuroradiol, vol. 24, No. 9, pp. 1869-1875, 2003.

Nakaguchi H. et al., "Efficacy of Dynamic CT Perfusion Imaging in Conjunction with Three Dimensional CT Angiography for the Evaluation of Acute Ischemic Stroke", Neurological Surgery, 31(1):17-25 , 2003.

Mayer T.E. et al., "Dynamic CT Perfusion Imaging of Acute Stroke", AJNR American Journal of Neuroradiol, vol. 21, No. 8, pp. 1441-1449, Sep. 2000.

Noël P. B. et al., "A Method for Improving Iodine Contrast Enhancement in Abdominal Computed Tomography: Experimental Study in a Pig Model", European Radiology, vol. 23, No. 4, pp. 985-990, 2013.

Teague S.D. et al., "Potential Clinical and Economic Benefits of Low-Contrast-Dose CT Angiography", Applied Radiology, 38(3), 40A., Mar. 2009.

Freiman M. et al., "Unsupervised Abnormality Detection Through Mixed Structure Regularization (MSR) in Deep Sparse Auto-Encoders", Medical Physics, vol. 46, issue 5, pp. 2223-2231, 2019.

Long J. et al., "Fully Convolutional Networks for Semantic Segmentation", Proceedings of the IEEE Conference on Computer Vision and Pattern Recognition (CVPR), pp. 3431-3440, 2015.

Ronneberger O. et al., "U-Net: Convolutional Networks for Biomedical Image Segmentation.", Medical Image Computing and Computer-Assisted Intervention (MICCAI), Springer, LNCS, vol. 9351, pp. 234-241, 2015.

Robbins H. et al., "A Stochastic Approximation Method", The Annals of Mathematical Statistics, vol. 22, Issue 3, pp. 400-407, Sep. 1951.

Kingma D. P. et al., "ADAM: A Method for Stochastic Optimization", arXiv preprint arXiv:1412.6980, 2014.

Zhu J-Y et al., "Unpaired Image-to-Image Translation Using Cycle-Consistent Adversarial Networks", Proceedings of the IEEE International Conference on Computer Vision, pp. 2223-2232, 2017.

He K. et al., "Deep Residual Learning for Image Recognition", Proceedings of the IEEE Conference on Computer Vision and Pattern Recognition, pp. 770-778, 2016.

(56) References Cited

OTHER PUBLICATIONS

He K. et al., "Identity Mappings in Deep Residual Networks", European Conference on Computer Vision, pp. 630-645, Springer, Cham., Oct. 2016.
Huang G. et al., "Densely Connected Convolutional Networks", Proceedings of the IEEE Conference on Computer Vision and Pattern Recognition, pp. 4700-4708, 2017.
Goodfellow I.J. et al., "Generative Adversarial Nets", NIPS'14: Proceedings of the 27th International Conference on Neural Information Processing Systems, vol. 2, pp. 2672-2680, 2014.
Qi G-J et al., "Loss-Sensitive Generative Adversarial Networks on Lipschitz Densities", Computer Vision and Pattern Recognition (cs.CV), arXiv preprint arXiv:1701.06264 (2017).
Arjovsky M. et al., "Wasserstein GAN", Machine Learning (stat. ML); Machine Learning (cs.LG), arXiv:1701.07875 [stat.ML], 2017.
Mitchell T. M. et al., "Machine Learning", p. 2, section 1.1, McGraw-Hill, 1997.
Brownlee J. et al., "A Gentle Introduction to CycleGAN for Image Translation", Feb. 2021 (Feb. 10, 2021), pp. 1-18, XP055824530. Retrieved from the Internet: URL:https://web.archive.org/web/2021021010 2051/https://machinelearningmastery.com/wh at-is-cyclegan/ [retrieved on Jul. 15, 2021].

CONTRAST BOOST BY MACHINE LEARNING

FIELD OF THE INVENTION

The invention relates to a training system for training a machine learning model for image enhancement, to a system for image enhancement, to a method for training a machine learning model, to a method for image enhancement, to an imaging arrangement, to a computer program element, and to a computer readable medium.

BACKGROUND OF THE INVENTION

Contrast media is used in an increasing number of diagnostic and interventional clinical procedures. Contrast media ("CM", or "contrast agent") is administered to patients intravascularly to improve tissue visualization during diagnostic imaging studies, for example in CT (Computed Tomography), angiography, fluoroscopy, MRI (Magnetic Resonance Imaging) and many other imaging modalities, or during certain therapeutic procedures such as PTCA (percutaneous transluminal coronary angioplasty), and others.

In addition, contrast media may be administered orally and/or via other natural orifices depending on the indications for the imaging procedure. Tens of millions of radiologic examinations that use (for example iodinated) contrast media are performed each year. For example, it has been estimated that 44% of the total CT studies in the US during 2010 used iodinated CM, 35% in India, 74% in Japan and 10-15% in China.

In contrast-enhanced CT the use of non-ionic iodine as a contrast medium can cause acute allergic-like reactions. These reactions range from mild symptoms such as urticaria and itching to more severe reactions such as cardiopulmonary arrest.

One of the most serious side effects of iodine-based agents is contrast medium-induced nephropathy. Nash et al. report in "*Hospital-acquired renal insufficiency*", *Am. J. Kidney Dis* (Official Journal of the National Kidney Foundation), vol. 39, pp 930-936 (2002), that contrast-medium-induced nephropathy is the third most common cause of acute renal failure in hospitalized patients, although not all such cases may be necessarily linked to CM administration. In any case, monitoring of the serum creatinine before CM administration is usually done before acquisition of contrast-enhanced CT data.

Thus, from a patient health point of view in terms of side effects, reducing the amount of contrast agent would be beneficial. However, while being aware of these health risks, contrast-enhanced imaging (such as in CT) is one of the most valuable day-to-day procedures in modern diagnostic imaging. Before image data acquisition, non-ionic iodine contrast medium or other contrast media is administered. Such administration is followed by a manual or a bolus tracker triggered start of contrast-enhanced CT data acquisition.

The resulting enhanced tomographic slices significantly improve the diagnostic quality compared with unenhanced (native) data. Because in unenhanced CT data the solid organs have similar densities within a range of 40-60 HU, differentiation of abnormalities is difficult. With contrast-enhanced CTs, the density of different tissues can rise above 100 HU. Such an improvement in image contrast can be observed, for example, with regard to the detection of tumors and lesions. For other diagnostic indications, like CT angiography or CT perfusion studies, contrast enhancement is also necessary.

In addition to the aforementioned clinical benefits of reducing contrast utilization, there is also a significant economic benefit of contrast utilization reduction in terms of cost. The CM cost can be high in certain territories (e.g., Japan $120/100 ml vs. $20 in North America). Moreover, non-ionic and low osmolar contrast agents, commonly used today, are better tolerated by patients regarding idiosyncratic effects, but are even more expensive.

As the amount of contrast agent administered to a patient is of concern, a set of technological enablers were developed to reduce contrast usage: use of power injectors, high rate chaser saline, faster rotation time, wider coverage area, bolus tracking software and the use of low kVp protocols and spectral/conventional enhancement algorithms. Some of these enablers are however expensive, complex, error prone, or difficult to use.

SUMMARY OF THE INVENTION

There may therefore be a need for alternative systems and methods to address some of the above mentioned shortcomings. In particular, there may be a need to reduce the amount of contrast media used in imaging.

The object of the present invention is solved by the subject matter of the independent claims where further embodiments are incorporated in the dependent claims. It should be noted that the following described aspect of the invention equally applies to the system for image enhancement, to the method for training a machine learning model, to the method of image enhancement, to the imaging arrangement, to the computer program element, and to the computer readable medium.

According to a first aspect of the invention there is provided a training system for training a target machine learning model for image enhancement for medical imagery, comprising:

an input interface for receiving a training input image drawn from a training data set including at least two types of training imagery, high image quality, IQ, imagery and low IQ imagery, the training input image being one of the high IQ type;

an machine learning model framework including a first generator network and a second generator network, wherein the target machine learning model comprises the said first generator network;

the first generative network to process the training input image of the high IQ type to produce a training output image having reduced IQ;

the target machine learning ("ML") model to further produce, based on the training output image and the training input image of the high IQ type, a second training output image, with the second generator network operable to estimate, from the second training output image, an estimate of the training input image of the high IQ type; and a training controller operable to adjust at least one parameter of the machine learning model framework, based on at least a deviation between the estimate of the training input image of the high IQ type, and the said training input image of the high IQ type.

In embodiments, the said machine learning model framework includes a sub-network of the generative adversarial type including the first generator network and a discriminator network; wherein the discriminator is to attempt discriminating between a training input of the low IQ type drawn from the set, and the training output image, to produce a discrimination result; and wherein the training controller operable to adjust parameters of the machine learning model framework further based on the discrimination result.

In embodiments, the target machine learning model is configured produce the second training output image by combining the training output image and the training input image of the high IQ type. The combining may be done by a linear combination of the training output image and the training input image of the high IQ type. Specifically, an, optionally scaled, difference between the training input image of the high IQ type and the training output image (having the reduced IQ), is added to training output image having reduced IQ.

In embodiments, the system is configured to process the training input imagery alongside contextual data that describe any one or more of: i) at least one image acquisition parameter, ii) at least one reconstruction parameter, iii) patient data.

In embodiments, an architecture of the first generator network and/or the second generator network is of the convolutional type.

In embodiments, the architecture of the first generator network and/or the second generator network is of the multi-scale type.

In embodiments, the IQ comprises any one of: i) contrast (level), ii) artifact (level) and iii) noise (level).

In embodiments, the high IQ imagery is imagery recorded by an imaging apparatus whilst contrast agent is present, and the low IQ imager is imagery recorded by the or a imaging apparatus whilst there is a lesser amount of the or a contrast agent present.

Accordingly, in other embodiments the two image classes of high IQ and low IQ may relate to classes of images with high and low contrast, or to images with low and high artifact contribution, or to images with low and high noise contribution, respectively. Such two classes of high and low IQ may also be defined for other image quality metrics. An image specimen from the high IQ class has a higher IQ than a specimen from the low IQ class. The IQ may be local or global. An average of an IQ metric may be higher for an image specimen from the high IQ class than it is for an image specimen from the low IQ class. In terms of contrast as one example for IQ mainly envisaged herein, in a high contrast image ("contrasted image") there may have been a higher amount/concentration of contrast medium present in the field of view ("FOV") of the imager when the image was acquired, than the amount/concentration of contrast medium present in the FOV when a low contrast image ("non-contrasted image") was acquired.

In embodiments, the high IQ/low IQ imagery in the set is X-ray imagery or MRI imagery.

In embodiments, the high IQ/low IQ imagery is computed tomography, CT, imagery.

In another aspect there is provided a storage medium on which is stored a target network trained by the training system of any one of the above described embodiments.

In another aspect there is provided an imaging arrangement comprising:
the target network as per any one of the above embodiments, operable to process an input image received from an image storage or supplied by an imaging apparatus, to provide a processed image; and
a display device for displaying the processed image.

In another aspect there is provided a method of training a target machine learning model, comprising:
receiving a training input image drawn from a training data set including at least two types of training imagery, high image quality, IQ, imagery and low IQ imagery, the training input image being one of the high IQ type;
processing, by a generative network, the training input image of the high IQ type to produce a training output image having reduced IQ, wherein the generative network is part of a machine learning model framework further including a second generator network, wherein the target machine learning model comprises the said first generator network;
processing, by the target machine learning model, the training output image and the training input image of the high IQ type, to produce a second output image;
estimating, by the second generator network, from the second output image, an estimate of the training input image of the high IQ type; and
adjusting, by a training controller, at least one parameter of the machine learning model framework, based on at least a deviation between the estimate of the training input image of the high IQ type, and the said training input image of the high IQ type.

In another aspect, there is provided a method of image processing, comprising:
processing, by the target network as per any one of the above mentioned embodiments, an input image received from an image storage or supplied by an imaging apparatus, to provide a processed image.

In embodiments, the machine learning model framework includes a sub-network of the generative adversarial type that includes as components the first generator network and a discriminator network. In such embodiments, the method further comprises:
by discriminator, discriminating between a training input of the low IQ type drawn from the set, and the training output image, thus producing a discrimination result;
and wherein the adjusting of the parameters of the machine learning model framework is further based on the discrimination result.

The machine learning framework as used above is in general a computational system comprising multiple ML models or sub-ML-systems, that are at least in parts interconnected in terms of at least one of their respective input(s) and output (s). In embodiments, the first and/or second generator and/or discriminator are of the artificial neural network type.

In another aspect there is a provided a computer program element, which, when being executed by at least one processing unit, is adapted to cause the processing unit to perform the method.

In another aspect there is a provided a computer readable medium having stored thereon the program element.

Thanks to the proposed training scheme, a smaller amount of contrast agent may be thus sufficient to still obtain images of sufficient, useful contrast, thus saving costs and discomfort for the patient. A significant reduction in CM usage can be achieved with the same clinical/radiological effects as before (when large amounts of CM were used), with no change in conventional CT scanning parameters and no compromise on clinical acceptance of CT studies, e.g., good vascular enhancement and good organ enhancement. The proposed system and methods compensate the contrast volume reduction by enhancement of study images.

In addition, the proposed methods and systems may be used as a general purpose image enhancement tool, which is not limited to reduced contrast protocols.

In particular, the proposed method and target model trained with the proposed system is configured to contrast boost only, or predominantly, the contrast media contribution in a given images, thus generating images with a more "classic" appearance, i.e., without artificial, unnatural look. Image portions that do represent contrast media, are largely replicated without changes.

In addition, the method and system could routinely improve and facilitate diagnosis by enhancing the conspicuity of lesions and abnormalities.

Moreover, in missed injection studies, the method and system could enable a dose reduction by salvage such studies and eliminate the need of repeated scans.

In addition to the above clinical benefits, there is also a significant economic benefit of contrast utilization reduction. Note that the direct cost could be high in certain territories (e.g., 120$/100 ml in Japan as mentioned above) and the indirect cost, e.g., prolonged hospitalization, therapy and repeated scans, could be very high.

The method has the attractive advantage of being based on an unsupervised learning approach. This approach eliminates the need to prepare large reliable paired training data, which is infeasible or a very challenging, tedious, time-consuming and hence costly exercise. In particular, no parings of contrasted and non-contrasted images are required for the proposed training system. This of particular benefit for present purposes of CM-based imaging, as in such protocols a given patient cannot normally be scanned twice, with two different amounts of contrast media and without any patient motion.

Specifically for IQ in terms of contrast, in embodiments, there is envisaged a training system for training a target machine learning model for image contrast enhancement for medical imagery, comprising:
- an input interface for receiving a training input image drawn from a training data set including at least two types of training imagery, high contrast imagery and low contrast imagery, the training input image being one the high contrast type;
- an artificial neural network model framework including a network of the generative adversarial type having a first generator network and a discriminator network, and the framework further comprising a second generator network; wherein the target machine learning model comprises the said first generator network;
- the generative network to process the training input image of the high contrast type to produce a training output image having reduced contrast;
- and the discriminator attempting to discriminate between a training input of the low contrast type drawn from the set, and the training output image, to produce a discrimination result;
- the target machine learning model to produce, based on the training output image and the training input image of the high contrast type, a second output image, with the second generator network operable to estimate, from the second output image, an estimate of the training input image of the high contrast type; and
- a training controller operable to adjust parameters of the artificial neural network model framework based on at least i) the discrimination result, and ii) a deviation between the estimate of the training input image of the high contrast type, and the said training input image of the high contrast type.

In general, a "machine learning component or module" is a computerized arrangement that implements a machine learning ("ML") algorithm. The algorithm is configured to perform a task. The ML algorithm may be based on an ML model whose parameters are adjusted by the ML algorithm in a training phase based on training data. In an ML algorithm, task performance generally improves measurably over time, the more (new and varied) training data is used in training. The performance may be measured by objective tests when feeding the trained model with test data and evaluating the output. The performance may be defined by requiring a certain error rate to be achieved for the given test data. See T. M. Mitchell, "*Machine Learning*", page 2, section 1.1, McGraw-Hill, 1997. The task of main interest herein is automatically increasing image contrast, or removing/reducing image artifacts/noise, or improving of other IQ (image quality) metrics.

BRIEF DESCRIPTION OF THE DRAWINGS

Exemplary embodiments of the invention will now be described with reference to the following drawings, which are not to scale, wherein.

DETAILED DESCRIPTION OF EMBODIMENTS

Figure 1:
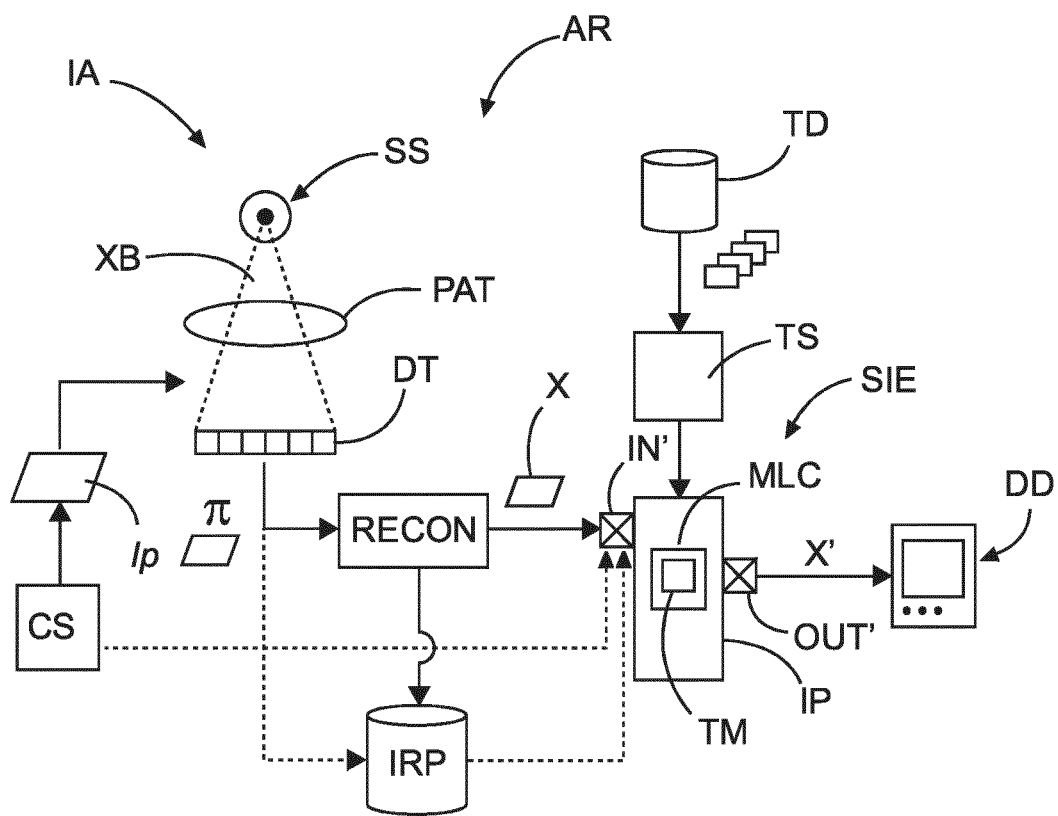
FIG. 1 shows a block diagram of an imaging arrangement including an imaging apparatus and an image processing system.

With reference to FIG. 1, there is shown a computerized imaging arrangement AR. The arrangement AR comprises, in embodiments, an imaging apparatus IA and a system for image enhancement SIE including an image enhancement processor IP. Very briefly, the image enhancement processor IP may be used to enhance image quality ("IQ") in imagery obtained by the imaging apparatus IA. The imagery to be enhanced may be supplied direct by the imaging apparatus IA, or may be retrieved from an image storage IRP. Image enhancement may include an increase in image contrast or a reduction or removal of image artifacts and/or noise. Image contrast can be measured and quantified by, for instance, the contrast-to-noise ratio (CNR). A higher CNR is preferred. In particular, contrast conferred by CM can be increased. The image enhancement processor IP is implemented in some embodiments by a machine learning model TM. A training system TS is provided that can train plural such ML models, including the (target) model TM based on training data TD. The model TM so trained can then be used by the image enhancement processor IP to compute the enhanced imagery. Before explaining the training system TS in more detail, components of the imaging arrangement are explained first.

The imaging apparatus IA (sometimes referred to herein simply as the "imager") is preferably envisaged herein for medical purposes and is operable to acquire one or more images of a patient PAT. Broadly, the imaging apparatus comprises a signal source SS to generate an interrogating signal XB. The interrogating signal XB interacts with tissue in patient PAT and is thereby modified. The modified signal is then detected by a detection unit DT. The detected signals, such as intensity values, form detector raw data or projection imagery. Projection imagery may be of interest in its own right, but at times the projection imagery is further processed by a reconstruction module RECON to produce reconstructed imagery X.

The imager IA envisaged herein may be configured for structural or functional imaging. A range of imaging modalities is envisaged herein such as transmission imaging and emission imaging or others, such as ultrasound (US) imaging. For instance, in transmission imaging, such as x-ray based imaging, the signal source SS is an x-ray tube and the interrogating signal is an x-ray beam XB generated by the tube SS. In this embodiment, the modified x-ray beam impinges on X-ray sensitive pixels of the detection unit DT. The X-ray sensitive detector DT registers the impinging radiation as a distribution of intensity values. The registered intensity values form projection imagery a. The X-ray projection imagery a, although sometimes useful in their own right such as in x-ray radiography, may then be transformed into cross-sectional images in CT imaging by the reconstruction module RECON. Specifically, the reconstruction module RECON applies a reconstruction algorithm to the projection imagery, such as filtered back-projection or other algorithms. A cross-sectional image forms a 2D image in 3D space. In CT, a plurality of such cross-sectional images may be reconstructed from different sets of projection images to obtain a 3D image volume.

In MRI imaging, the detection unit is formed from coils, that are capable of picking up radiofrequency signals that represent the projection imagery, from which MRI cross-sectional images may be reconstructed by MRI reconstruction algorithms.

The X-ray imagery in CT or radiography represents structural details of the patient's anatomy. In emission imaging, such as PET or SPECT, the signal source SS may reside inside the patient in form of a previously administered radioactive tracer substance. Nuclear events caused by the tracer substance are then registered as projection images at a PET/SPECT detector DT arranged around the patient. A PET/SPECT reconstruction algorithm is then applied to obtain reconstructed PET/SPECT imagery that represents functional details of processes inside the patient, such as metabolic processes.

The imaging apparatus IA is controlled by an operator from an operator console CS. The operator can set a number of imaging parameters Ip. Imaging parameters comprises acquisition parameters and/or, if applicable, reconstruction parameters. The acquisition parameters refer to settings of the imaging apparatus that control the imaging operation, such as X-ray tube settings (amperage or voltage) or similar. A reconstruction parameter on the other hand relates to parameters that relate to operation of the reconstruction algorithm. The reconstruction parameters are not necessarily set at the operator console CS, but may be set, at a later stage, at a work station or other computer In x-ray imaging, acquisition parameters may include any one or more of the following: scan type, body part, XR source (tube) XR settings such as mA, mAs, kVp, rotation time, collimation setting, pitch, etc. "Scan type" can be helical or axial and/or may specify the region of interest (ROI) to be imaged, such as chest, lung, pulmonary embolism, cardiac, etc. "Pitch" is a parameter in multi-slice spiral CT and is defined as the ratio of table increment over detector collimation.

If a reconstruction operation by the reconstruction module RECON is called for, such as in CT or MR or in emission imaging (PET/SPECT), this may require the specification of the reconstruction parameters to adjust the reconstruction algorithm. Suitable reconstruction parameters envisaged in CT reconstruction may include any one or more of the following: reconstruction filter, reconstruction algorithm (e.g., FBP, iDose or IMR), slice thickness, slice increment, image size (in pixels or voxels, m×n) and field of view, etc.

The acquisition parameters specify how the imaging apparatus is to operate to acquire image signals which are then converted into image values. The reconstruction parameters describe how the image values are converted from one domain (eg, projection domain) into other image values in a different domain, eg image domain. Both parameters, the imaging parameters and/or the reconstruction parameters, are thus influencing the image values or distribution thereof in the imagery.

Unless specifically stated, in the following, no distinction will be made between reconstructed images or projection images, and we will refer to both simply as input image(s) or "imagery" X to be processed by the image enhancement processor IP. In other words, the image enhancement processor IP may be configured therein to operate on imagery from the projection domain or may act on imagery reconstructed in imaging domain.

The input imagery X produced by the apparatus IA, or retrieved from a storage IRP, is received at the imaging processor IP at its interface IN', through wired or wireless communication means for example. The imagery X may be received directly from the imaging apparatus, or may be retrieved from an imaging repository IRP where the imagery is stored after acquisition.

Some imaging protocols require the administration of contrast agent/medium to the patient to boost image contrast, a higher CNR, in respect of organs or tissue that are not, in and by themselves, sufficiently radiation absorbent. Contrast agents/media may be used in CT or other X-ray based imaging modalities but may also be used in MRI for example. Before or during imaging, a volume of liquid contrast media (such as Iodine based) is administered to the patient, is allowed to accumulate at the ROI at sufficient concentration, and imaging then commences or continues to acquire "contrasted", high contrast imagery for or of the ROI.

In most imaging modalities, for technical, physical or other reasons, acquired or processed imagery may be inflicted by image artifacts. Image artifacts are image structures that do not represent actual structural or functional properties in the imaged object, or the representation in the imagery is somehow distorted or otherwise unsatisfactory. In X-ray imaging, such image artifacts may be present in projection imagery or reconstructed imagery. Image artifacts include any one or more of beam hardening artifacts such as streaks, cupping artifacts, ring artifacts, partial volume artifacts, incomplete projections, photon starvation, patient motion, ring artifacts, helical and cone beam artifacts, and others. Other imaging modalities such as MRI may attract other artifacts, such as chemical shift, wrap-around, Gibbs artifacts, metal artifacts, or RF based artifacts, field inhomogeneities, etc.

IQ in terms of noise is often influenced by the energy of X-radiation used for example, or by imperfections in the detector hardware. Detective quantum efficiency (DQE) may be used to define the amount of noise introduced by the detector hardware. Some image processing algorithms, such as reconstruction algorithms, may also introduce noise on their own.

The image processor IP is capable of producing enhanced imagery, such as artifact or noise reduced or contrast increased. For example, possibly artifact ridden input imagery X as received at the input port IN' of the image processor IP is processed into output imagery X' and is output at output port OUT'. Operation by the image processor IP causes the artifacts to be reduced or entirely removed. In addition, or instead, a low contrast image X, acquired with no or little contrast agent present, may be processed by image enhancement processor IP into a higher contrast image X'.

The output imagery X' may be mapped on a suitable grey value or color palette and may then be visualized by a visualizing module (not shown) on a display device DD.

The image enhancement processor IP may hence assist a diagnostician in properly interpreting the input imagery X by using the enhanced imagery X'. The image processor IP may be run on a general purpose computing unit. The computing unit PU may be communicatively coupled to the imaging apparatus or to the imaging repository IRP. In other embodiments the image processor IP is integrated into the imaging apparatus IA. The imaging processor IP may be arranged in hardware or software, or in a combination thereof. Hardware implementations may include suitably programmed circuitry, such as a microprocessor or microcontroller, an FGPA or other general purposes circuitry. Hard coded circuitry is also envisaged herein such as an ASICS or on-chip system, or other. A dedicated processor, such GPU (graphical processing unit), may also be used.

Referring now in more detail to the nature of the imagery to be processed, this can be conceptualized as data structures in 1D, 2D or 3D or even higher dimensions (eg, time series of images) comprising a plurality of numbers. Depending on the contrast conferring mechanism that underlies the imaging, the numbers represent intensity values of a physical quantity or phenomenon to be imaged for. The numbers may be referred to herein as image values. The data structures referred to above may include one or more n-dimensional matrices, or "tensors" (n>3). Suitable values for n are 1, 2, 3, 4 or n>4. The image may be greyscale or color. Color imagery may be encoded in an RGB scheme or another suitable encoding scheme.

The image values may be represented in rows and columns i,j to represent spatially two dimensional structures. Spatially three-dimensional image values may be represented as rows and columns i,j and a depth component k.

In embodiments, the image may be represented in a 2D structure with rows and columns i,j but the image in fact forms a section or sub-space of a three dimensional volume such as the slice images of a CT 3D volume. Similarly, MRI volumes may also include 2D slice images which are sections in 3D. 2D or 3D imagery acquired through time may be represented as a 3D or 4D image data, respectively, with the third or fourth component representing acquisition time.

Even though the imagery represents 2D structures, at times a higher dimensional representation may still be used such as in color images encoded in RGB. An RGB image may be represented as a three dimensional structure with the two spatial dimensions i,j corresponding to structure or function in the patient, whilst another component represents the red, green and blue image values respectively for any given image location i,j. In other words, 2D color image maybe represented as a 3D volume formed by the super position of three distinct 2D images each representing respectively the red, green and blue image values for a given image location.

Accordingly, spatially 3D color imagery acquired through time may thus be represented as a seven-dimensional tensor: three spatial dimensions, three dimensions for the color values, and one dimension for time. A grey value image may be represented without an additional depth component.

In relation to image data, "size" as used herein refers to the number of data value (numbers) entries in a matrix or tensor. "Dimension" refers to the number of spatial arrangements. For instance, a matrix (eg, an image) with pixels 50×50 has a larger size than an image 40×40 or 50×40. But both have the same dimension. A three channel image 50×50×3 has a larger dimension (3D) than a 2D image at 50×50. Because the 3D image also has more data points, it is also larger in size.

Turning now in more detail to the computerized imaging processor IP, this includes in embodiments a pre-trained machine learning component or module MLC. The pre-trained machine learning component MLC includes a pre-trained machine learning model TM. The machine learning model TM, such as an artificial neural network or other, has been previously trained by a computerized training system TS to be described more fully below. Training is based on a set ("corpus") of training data TD.

The training data TD includes in particular historic imagery. In embodiments, the training data includes historic x-ray, MRI, UV, PET/SEPCT or other images collected from previous patients. The corpus TD of training data comprises two categories of data, referred to herein a high contrast and low contrast images as one example of high and low IQ imagery. A pairing of low versus high IQ, such as low contrast/high contrast images is not required herein for the operation of the training system TS. Whilst mainly envisaged herein, the high and low contrast in the images is not necessarily caused by different contrast media concentrations present in the field of view (FOV) of an imaging apparatus, when those images have been acquired. For low/high contrast images may be generated instead "synthetically", using spectral or dual imaging techniques. Specifically, the low/high contrast image may be generated by using low keV images, which could be obtained in a spectral scan that also provides a conventional CT image to define the two classes of low/high contrast images.

In addition, or instead, an Iodine map could also be obtained in a spectral scan that, together with the conventional CT image, provides instances of high and low contrast images, respectively. In this case, the counterpart high contrast image could be obtained by combing the Iodine map, by addition or multiplication, with the low contrast image. Alternatively, the iodine map may be so combined with the low contrast image by multiplying the map first with some factor (a control parameter) and to then add the Iodine map (with the multiplied-into factor) to the low contrast image. Alternatively still, it may also be possible to form the contrasted image member by registering a high contrast image of any modality with a low contrast image of any or the same imaging modality.

In other embodiments, image enhancement relates to artifact reduction, and accordingly the training set TD may comprise a class of artifact ridden image and another class of artifact free images (or images with artifacts of lower severity). The classification may be done by human experts, or by auxiliary machine learning systems. Similarly, for embodiments on image enhancement in terms of noise reduction, the two classes of high and low IQ imagery comprise high and low noise imagery.

In general, images from the training set TD will be referred to herein as "training images/imagery" in the two categories of high and low contrast, to which main reference will be made herein, although the below is explicitly envisaged for other types of IQ.

The machine learning model TM is in general operable in two modes, in training mode and in deployment mode. The training mode occurs before deployment mode. The training mode may be a one-off operation but may be done repeatedly. More specifically the machine learning model TM comprises an architecture and a plurality of parameters arranged according to the architecture. These parameters are initialized. The training system TS adjusts during training mode the parameters based on input training imagery processed by the to-be trained model TM. Once the parameters have been sufficiently adapted in one or more iterations, the so pre-trained model TM may then be used in deployment in the machine learning component MLC of the image processor IP as mentioned above. In deployment mode, the pre-trained machine learning model TM can process the received input imagery to reduce or remove image artifact/noise as mentioned above, or to increase contrast. Crucially, the input imagery X in deployment may not be part of the training imagery, so that the machine learning model TM has never "seen" the input imagery before. After suitable training, the machine learning model TM is capable of transforming the input imagery X into a higher contrast version $\bar{X}$ of the (lower contrast) input image X, or similar for other IQ metrics.

With reference to the block diagram in FIG. 2, operation of the proposed computerized training system TS will now be explained in more detail.

The training system TS may reside in one or more computer readable memories MEM. The computerized training system TS may be executed by a processing unit PU such as general purpose CPU circuitry or, preferably, specialized circuitry such as one or more GPU's (graphical processing units) or others. The components of the training system TS may be implemented on a single computing device or on a group of computing devices, such as servers and others, in a distributed or "Cloud" architecture connected in a suitable communication network.

Machine learning may include adjusting parameters of the machine learning model TM. Machine learning, or training, is implemented by the training system TS. The model is capable of processing input into output. The model parameters are adjusted/updated by training controller TC of the training system TS, based on the set of training data TD. The parameter adjustment or updating operation may be formulated as an optimization problem. The optimization problem may be formulated in terms of one or more objective functions E. The parameters are updated so as to improve the objective function. The objective function is implemented by the training controller TC. The objective function may be a cost function, and the parameters are updated to reduce a cost as measured by the cost function.

Figure 2:
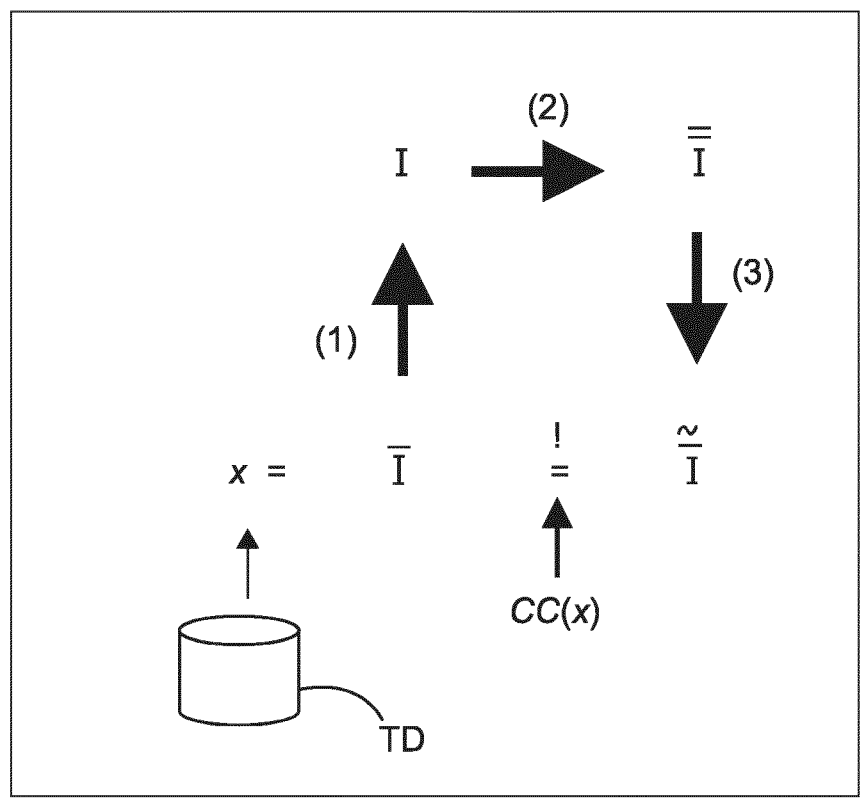
FIG. 2 shows a flow chart of a principle of operation of a training system for training a machine learning component that can be used to implement a IQ enhancer.

A principle of operation of the proposed training system TS will now be explained in more detail with reference to the operational commutative diagram as shown in FIG. 2. This diagram shows processing paths involved in training target ML model TM. As can be seen in FIG. 2, the processing paths form a closed feedback loop or cycle whose consistency is checked by a cost function E=CC( ). The cost function CC( ) may form part of a system of cost functions E. $E_j$ used by the training system. The cost function CC will be referred to herein as the cycle consistency checker function CC(x) (or "checker function" for short). Initial input x processable by the cost function CC(x) refers to an image specimen drawn from the training data set TD. As mentioned, the training data set includes at least two classes or category of images, in embodiments high contrast and low contrast imagery, for example contrast enhanced and non-contrast enhance imagery. "Contrast enhanced image(s)" may be referred to herein as a contrasted image(s) and non-contrast enhanced imagery as non-contrasted image(s). Assuming for a now that the drawn specimen is from the contrasted class of images, such image will be referred therein as $x=\bar{I}$, whilst members of the non-contrasted class of images will be referred to herein by the symbol "x=I" (without the "bar" symbol "¯").

The training system TS first transforms input image $\bar{I}$ by a first transformation (1) into an estimate for a low contrast image I. Next, at transformation (2) transforms this low contrast estimate into a contrast boosted or contrast improved estimate $\bar{I}$. From this image, $\bar{I}$, and in so closing the cycle, a third transformation (3) is applied to estimate again a low contrast image $\tilde{\bar{I}}$. Ideally, this last estimate $\tilde{\bar{I}}$ should substantially equal, within applicable error bounds, the initial input image $\bar{I}$. The cycle checker function CC(x) is implemented by the training controller TC as a cost function to encourage the training system TS to choose model parameters, so that the output image $\tilde{\bar{I}}$ is approximately similar or equal to the input image. This cycle is indicated by the round error at the center of diagram FIG. 2. The proposed-consistent-cycle based learning has been found to yield good and robust results. The above mentioned transformations (1)-(3) are implemented in part as machine learning models whose parameters are adjusted under control of the cost function. The said machine learning models include the target model TM. Preferably, neural network type models are used to implement at least some of the above described transformations. In particular, transformations (1),(3) are based on machine learning models whilst the transformation stage (2) can be defined analytically or also as a machine learning model. Target model TM preferably implements the first and/or second transformations (1)(2).

The cycle consistency checker function CC(x) may be formulated in terms of a contrast map M that measures the amount of contrast in the imagery generated in the transformation paths (1)-(3) described above in FIG. 2. The above described feedback loop or cycle constitutes an approximate commutative diagram. The identity function is approximated in terms of a concatenation the three transformations (1)-(3). The somewhat counter intuitive first transformation that reduces the contrast, although one wishes to train the target model TM for contrast improvement, has been shown to make the training more resilient and robust. In addition, it has been found that using the above commutative arrangement FIG. 2, preferably in combination with the contrast-map driven cycle consistency checker function CC(x), one can account locally for contrast changes. Specifically, contrast enhancement can be focused substantially to regions in the recorded imagery that represent contrast agent. More specifically, regions that represent contrast agent are contrast-enhanced stronger by the trained model TM than regions that do not represent contrast agent. Yet more specifically still, substantially only such contrast agent representing regions are contrast enhanced, whilst other regions are not and hence remain substantially unchanged.

Further to FIG. 2, instead of using imagery from two categories, high and low contrast, the same principles may be applied to other image quality ("IQ") metrics, such as high/low noise, high/low artifact contributions, etc, In this case, transformation (1) acts to reduce IQ, that is, to increase artifacts or noise.

The communicative diagram in FIG. 2 thus represents processing in repeated cycles of IQ reductions and increase, when processing imagery from the high IQ class, such as contrasted images. If the input image x is draw from the low contrast class, the training system encourages parameters so that such a low contrast training input image is passed preferably unchanged through the transformations (1)-(3). The processing in the diagram is thus asymmetric with respect of image category.

Figure 3:
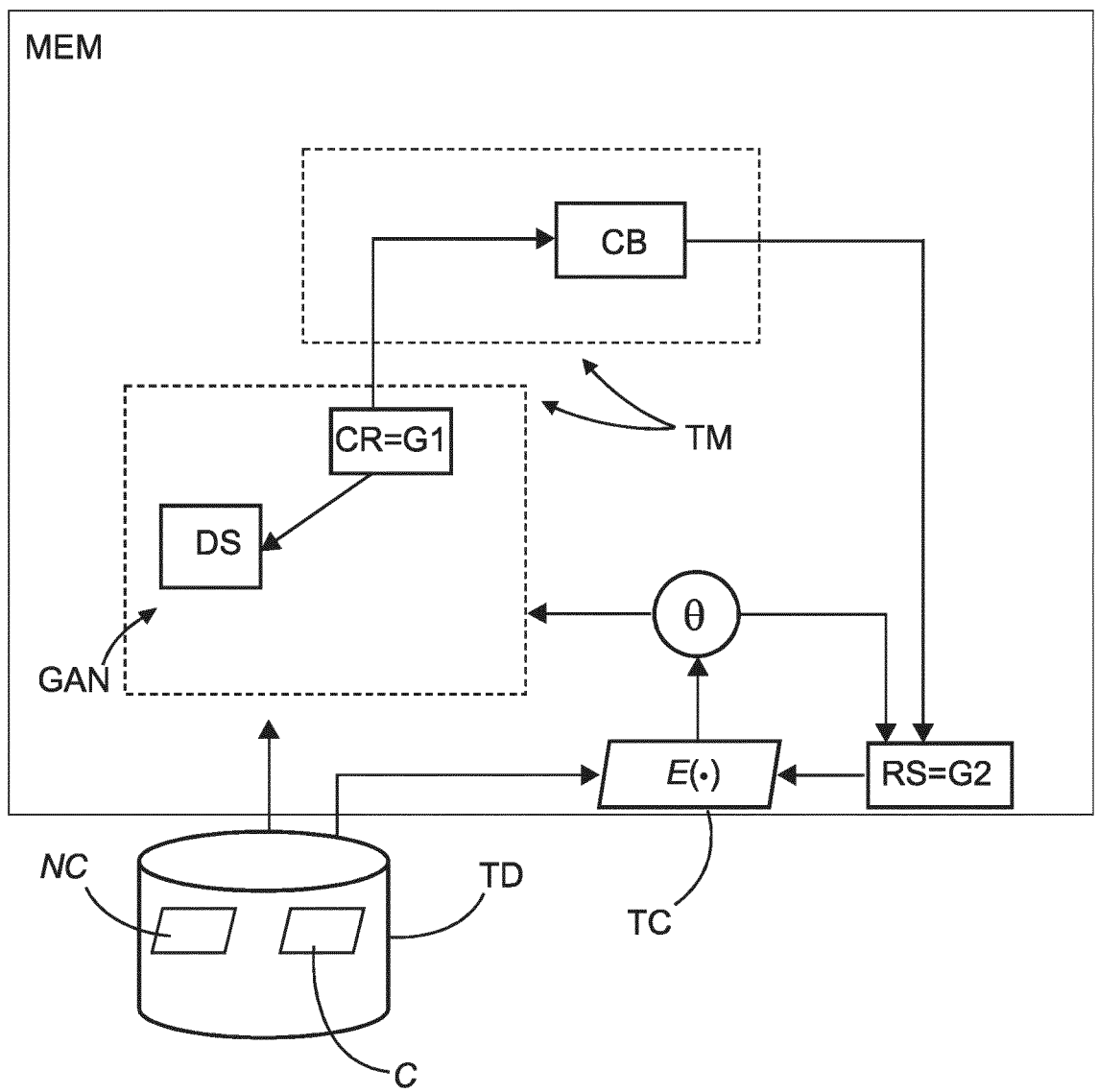
FIG. 3 shows a block diagram of a training system including two generator networks and a discriminator network.

The target model TM to be trained for contrast enhancement is preferably embedded in the training system TS with additional interconnected machine learning models and optionally analytical models as will now be explained in more detail in the block diagram of FIG. 3 to which reference is now made. Specifically, FIG. 3 shows an embodiment of the above described principles of FIG. 2. FIG. 3 shows multiple components including machine learning models and an optional analytic conversion stage (not necessarily ML-implemented). The components have some of their input and outputs interconnected and embedded in the training system formed by those interconnections. As mentioned, some of the models are neural network type ML models, but other machine learning models, not necessarily of the neural network type, are also envisaged herein.

Specifically, in embodiments the training system TS includes two ML models of the generative type, referred to herein as generators G1 and G2. In addition, there is a discriminator DS and an analytical convertor pathway CB. The training controller TC implements the above mentioned cost function E=CC, or system of cost functions $E_j$, including the above described consistency checker CC( ), and possibly one or more regularizer terms R, to be explored in more detail below. The cost function E. $E_j$ processes output produced by the models and an updater UT of controller TC adjusts current parameters of the models to improve the objective function, for example reduce the cost. The adjustment may proceed iteratively.

In operation, training input imagery is drawn from the set of training data TD including, as mentioned above at FIG. 2, a class of contrasted C (high contrast) imagery and class of non-contrasted NC (low contrast) imagery. Notably, the images into the classes NC, C do not need to be paired. The training imagery from classes NC. C is applied one-by-one or in batches to the training system TS, and is processed by the pluralities the mentioned components to produce a training output. The training output is evaluated by cost function(s) E,$E_j$, and based on the cost returned by the cost function E, including checker CC( ), the parameters of the training system are adapted until a stopping condition is fulfilled. In the following, we will simply refer to "the cost function E", with the understanding that this may be a reference to system of cost functions $E_j$, and includes in particular the checker CC( ) function and possibly other terms, such as one or more regularizers R.

The target model TM in the scheme of FIG. 3 includes the first generator G1 and the analytic conversion path CB as will be described in more detail below. The target model TM comprise in embodiments the two models G1, CB, together trained jointly with the remaining components G2, DS. The target model TM can then be used later, once training concluded, as a stand-alone machine learning module to enhance (increase) contrast in imagery processed during deployment. This during-deployment imagery was not previously "seen" by the system, so is, in particular, not part of the training data set. Once training concluded, the remaining machine components of the training system, in particular discriminator DS and the other generator G2, can be discarded as these are no longer required. The training can be a one-off, or may be done repeatedly as new training data emerges as required. In the later cases, where training is envisaged in multiple phases, the remaining components D, G2 should be retained for future training runs.

The two models G1, G2 of the generative type are distinguished from the model DS of the discriminator type. Generative type models generate samples from an unknown distribution of specimens, whilst discriminators allow distinguishing between two or more categories or classes. In the preferred embodiment as envisaged herein the discriminator DS and the first generator G together form an adversarially coupled sub-system of the (global) training system TS, to be described in more detail below. In embodiments, this ML training sub-system forms a generative adversarial network ("GAN"), a type of ML networks described by Ian Goodfellow and co-workers in their 2014 paper "*Generative Adversarial Networks*", published as pre-print under arXiv: 1406.2661v1.

Some or each of the above described component models, D, G1, G2 may have their own cost function associated therewith and these cost functions, together with optional regularization terms, form the system of cost functions $E_j$. Some of those cost functions include the cycle consistency checker CC( ). All or some of the cost functions may be combined, for example additively, to form one common cost function E. As is also the case for the general principle as per FIG. 2, the cost functions are preferably interdependent, so a change in cost in one component cost function may affect the costs returned by some or all of the other component cost functions. The interdependence comes about because the cost function for one component refers not only to parameters of its own model, but also to some or more parameters of some or all of the other models.

The adjustments of the parameters by updater UT may proceed in training through one or more iterations. The adjustment may processed at once to improve the common cost function E, or proceed in turns, to alternately improve each or some of the component cost functions $E_j$ one (or more) at a time. In either case, adjustment of the initial or current set of parameters of the above described machine learning models are done so as to improve, ie reduce, the overall cost. The overall cost is the addition of all partial cost as per the various component cost functions or regularizer terms (if any) involved, whether or not training proceeds separately in turns, or at once.

Turning now in more detail to the GAN type sub-system (G1, D) of the training system TS, the first generator G1 and the discriminator DS have their respective cost functions adversarially coupled. Specifically, and assuming the parameters of the other cost functions are kept constant, the cost functions for first generator G1 and discriminator DS implement a zero-sum game in the game-theoretic sense. The sum of the two cost functions may be considered constant. A reduction in cost in one is to the detriment of the other thus resulting in an increase in associated costs of that model.

In yet more detail, in the GAN sub-system, the first generator G1 may be referred to herein as a IQ reducer, such as a contrast reducer CR. It operates as follows in embodiments. The reducer CR takes as input an initial input image x drawn from the training data set TD. As explained above at FIG. 2, this input image may be either contrasted C or non-contrasted NC. If the input image is of the contrasted/high contrast type C, it includes image region(s) that represent contrast agent. The reducer CR, G1 acts on this image $\bar{I}$ to reduce the contrast so as to attempt replicating a specimen from the non-contrasted class NC. The discriminator DS analyzes Reducer CR's output, namely the contrast reduced version I, and attempts to correctly classify this image I as belonging to either one of the two classes, contrasted C or non-contrasted NC. the two cost functions of first generator G1/reducer CR and discriminator DS are thus configured and interdependent, so that the discriminator maximizes its probability for correct classification whilst the generator attempts to "fool" the discriminator to produce output that leads to a miss-classification by the discriminator. How exactly the cost functions of the GAN can formulated in embodiments will be explained further below at eqs (1,6).

The contrast reduced output I of the GAN network is then fed into a synthesizer component or synthetic contrast enhancer or "booster" CB that is preferably arranged as an analytic processing path using algebraic operations and whose parameters are not adjusted during the machine learning. Alternatively, this component CB too may be implemented as a machine learning component whose parameters are adjusted during the learning. The contrast enhancer CB uses the contrast reduced estimate I to compute an estimate of a contrast boosted or contrast enhanced image $\tilde{I}$. The contrast in this estimate is at least locally as high or higher than the initial input image $\bar{I}$. The high contrast estimate image $\tilde{I}$ is fed into the second generator G2 for processing. In this connection, the second generator G2 may be act as a restorer. This second generator G2 will thus be referred to herein in the following as "restorer RS". More specifically, the contrast enhanced estimate $\tilde{I}$ is processed by the restorer RS in an attempt to restore the original input image $\bar{I}$. That is, the restorer RS operates on the contrast boosted image to produce an image $\tilde{\tilde{I}}$ that is similar or equal to the initial contrast enhanced image as processed by the GAN. The restorer is thus configured to reverse the contrast boost that resulted by operation of the contrast booster CB. The cost function E of the training system computes the cost based in particular on both, i) the classification result as produced by the discriminator DS, and ii) the similarity of the initial input image $\bar{I}$, and the image $\tilde{\tilde{I}}$ as output by the restorer RS. The cost function E awards i) lower partial cost if the discriminator correctly classifies the output of reducer CR, and ii) a partial cost that is the lower the smaller the deviation between the output $\tilde{\tilde{I}}$ the restorer RS and the initial input image x=$\bar{I}$. The partial cost ii) measured by the consistency checker function CC( ).

At the same time, if the initial input image x drawn in during training is of the low contrast type, the GAN-network should ideally leave this low contrast image I essentially undisturbed. In particular, the training system as a whole should act on specimens from the non-contrasted set NC as a unity operator with ideally no, or only small changes, to the input image whilst this image is propagating through the training system TS.

In yet other words, the training system TS approximates a unity operator by essentially allowing the non-contrasted specimens to propagate through the system undisturbed. However, for contrasted input imagery, whilst the training system still approximates the unity operator, this is only with respect to initial input and output. But the contrasted input imagery still undergoes changes as it propagates through the system TS in the described cycle of contrast reduction, is then contrast boost by booster CB, followed by another contrast reduction by the restorer RS. These two modes of asymmetric processing in respect of contrasted and non-contrasted imagery, together with the above described consistency checker function CC as cost function, allows robust learning and locally focused contrast increases. Contrast is increased only at contrasted image portions of input imagery, whilst the remaining non-contrasted portions of the image are left essentially undisturbed (within the predefined error boundary). The locally focused or selective contrast enhancement allows producing contrasted enhanced imagery with a more natural look as compared to other contrast enhancement schemes that tend to produce artificial looking images because contrast is enhanced everywhere in the image. Such artificial looking contrast enhanced images are not well accepted in clinical practice.

It will be understood that the training system TS implements an optimization operation in respect of the cost function. However, dual formulations of such an optimization in terms of utility functions are also envisaged herein, and so are embodiments where both, a maximization of a utility function and minimization of a cost function are envisaged. In this case, the objective is to increase the overall utility rather than to reduce the cost described herein. However, both formulations of objection functions in terms cost and utility are envisaged as alternatives or in combination, despite the following description focusing on optimization of a cost function.

Figure 4:
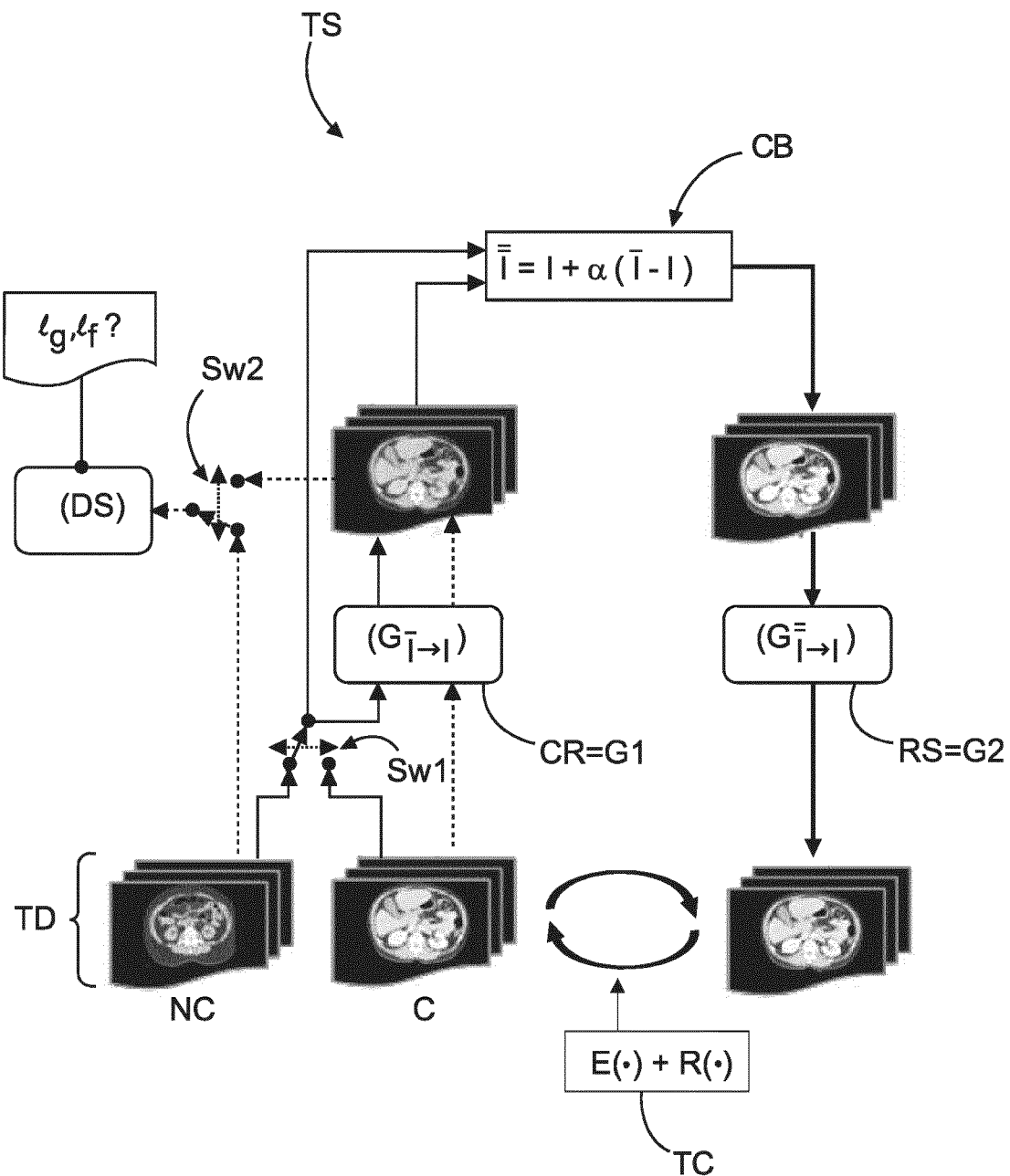
FIG. 4 shows an embodiment of the training system of FIG. 3.

Reference is now made to FIG. 4 that shows more details of a GAN-based implementation of the above described training system TS of FIG. 3.

The training input imagery x from the two categories of the training data set of contrast C and non-contrasted NC, may be selected by random or deterministic switch SW1 from set TD.

An optional second switch SW2, deterministic or random, switches through the output of the contrast reducer CR to the discriminator for discrimination into labels for genuine or fake $\ell_g, \ell_f$.

The analytic conversion path of the contrast booster CB may be implemented as shown as an algebraic operation. More particularly, the algebraic operation may include forming a linear combination of the original input image $\bar{I}$ and the contrast reduced version I produced by the contrast reducer CR. More particularly still, contrast essentially originating from contrast agent is measured by taking the point-wise difference between the initial image $\bar{I}$ and the contrast reduced version I. This contrast measurement is then linearly scaled by a factor $\alpha$, and the scaled contrast is then added to the initial contrasted image $\bar{I}$ to so build the contrast boosted estimate $\tilde{I}$. Contrast boosted estimate $\tilde{I}$ is then processed by the restorer RS to attempt restoring the original high contrast input image $\bar{I}$ as was input into the contrast reducer CR. If the original input image is drawn from the non-contrasted type NC, the network TS leaves the image essentially undisturbed as it passes through the various network stages. In either case, the cost function is configured (as will be shown below in more detail) to encourage a convergence of the optimization towards model parameters that yield, as output at the final stage of restorer RS, an approximate copy of the initial input image x. whether x was drawn from the contrasted or no-contrasted category.

Different processing paths on the left in FIG. 4 are shown for clarity in dashed and solid lines. The dashed lines represent process flow in the GAN sub-system. The solid lines in the left portion of FIG. 4 represent the process flow between the GAN and the booster CB.

The above so far described is mainly focused on the training aspect and operation of the training system in training phase when the training imagery is drawn from the training data set and processed to adapt parameters of the various machine learning models DS, G1, G2 that make up the training system.

Figure 5:
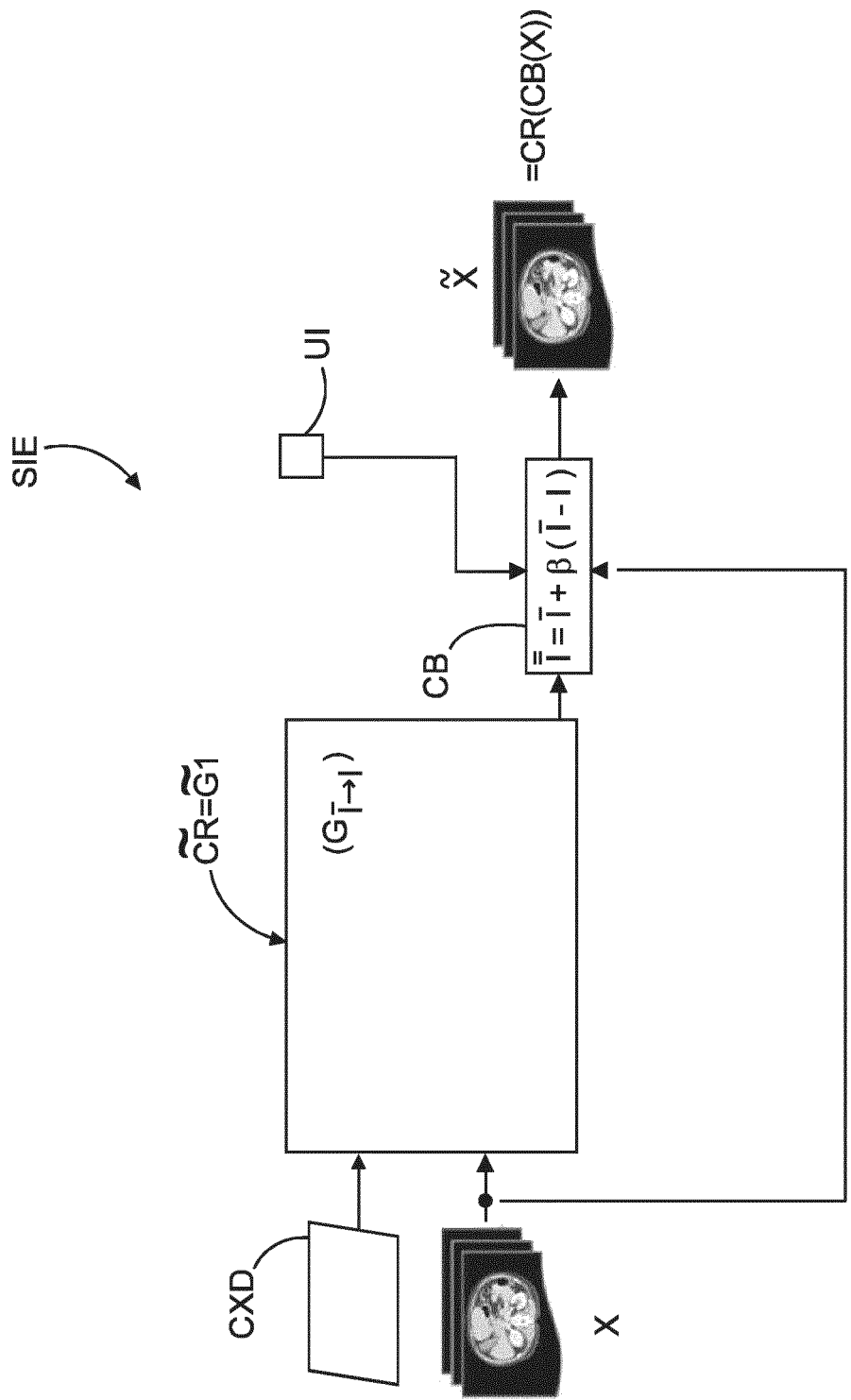
FIG. 5 shows a schematic block diagram of a trained machine learning model as provided by the training system of any one of FIGS. 2-4.

Reference is now made to FIG. 5 which shows a schematic block diagram of the target model TM, comprising the first generator G1, CR, once fully trained, and the analytical contrast booster stage CB. Once training has completed, the remaining machine learning models DS and the second generator G2=RS can be discarded. Specifically, at the conclusion of the training phase, the current parameters of the contrast reducer CR and instructions for the contrast booster CB may be copied, in the given architectures, into a memory. The trained model contrast reducer CR and the contrast booster together form the target model TM of the machine learning module MLC of the contrast enhancer SIE. The machine learning module MLC can now be used to perform, during, deployment or testing, the envisaged image contrast enhancement operation.

In operation during deployment or testing, an input image X (not from the training data set on which the models CR, DS, RS were trained) is received at the now trained contrast reducer $\widetilde{G1} = \widetilde{CR}$ (now indicated with a tilde "~"), optionally with contextual data CXB as will be explained in detail below. The input imagery X, and possibly the contextual data CXB, is/are then processed jointly by propagation through the trained contrast reducer $\widetilde{G1} = \widetilde{CR}$ to emerge as output (not shown). This output together with the initial input image is then processed by the contrast booster to produce the contrast or other IQ enhanced output image $\tilde{X}$. The contrast booster may use linear combination to build IQ enhanced output image $\tilde{X}$. The linear combination may include a booster parameter β, as described above.

The contrast booster parameter β (≥0) may be a fixed meta-parameter, or may be user adjusted by a suitable user interface UI, such as a touch screen, a keyboard or any other user interface for supplying input. The IQ enhanced image, such as contrast enhanced image $\tilde{X}$ may be further processed, stored or displayed on the display device DD by a visualizer component (not shown), as required.

Figure 6:
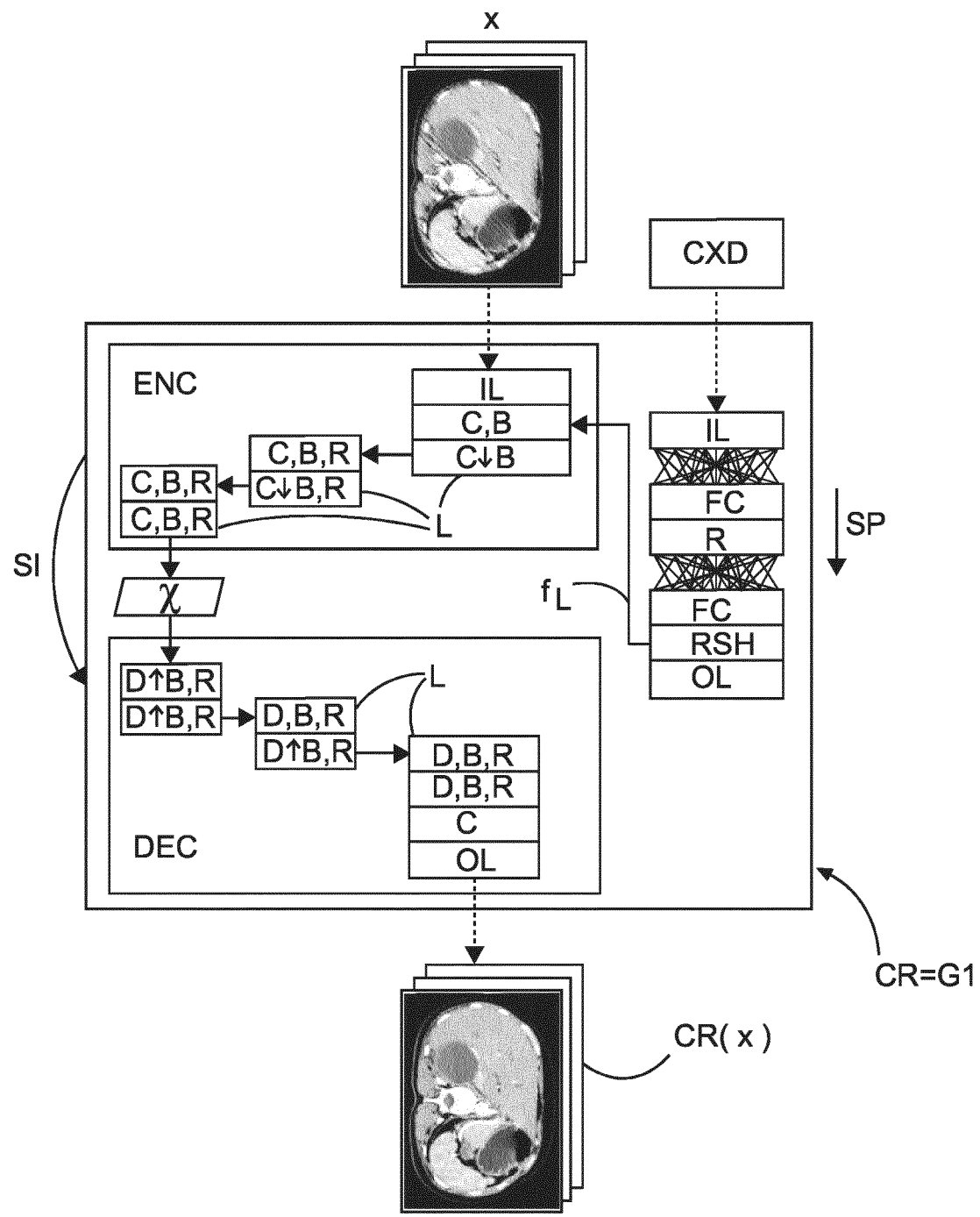
FIG. 6 shows an artificial neural network model of the convolutional type.

Reference is now made to FIG. 6 which shows an artificial neural network-type ("NN") architecture which can be used for generator G1. Whilst the following description will focus on the first generator G1=CR, the same network set-up may be used for the second generator G2 also. In general, the envisaged NN-type architecture is a multi-scale convolutional network with an optional processing path for (in general non-image) contextual data CXD. The contextual data processing facility may not be required in the second generator G2, but can still be implemented, if required.

Turning now in more detail to the proposed target model CR and FIG. 6, this is configured to transform the training input imagery, x, into a training output image CR(x) of reduced contrast, if x=Ī is an image of the contrasted class. Otherwise, CR(x) equals or is approximately equal to x, the mode. CR thus acting as the (quasi-)identity operator.

Preferably, the dimension and size of the training input imagery is preserved. That is, the dimension and preferably the size (number or rows and columns, etc) of the training input imagery, corresponds, or is equal to, the dimension and size of the training output image I' as supplied at output OUT.

However, during the processing of the training input imagery x, the training input imagery x is first transformed into a lower dimensional representation χ by an encoder component ENC of the reducer G1, CR. In addition, also the size may be reduced. This lower dimensional and/or smaller sized central intermediate representation χ of the training input imagery is a reduced version of the input image x. The representation is "intermediate" in the sense that it does not form the final output of model CR. It is "central" in the sense that it is formed within the target model CR during processing. The central representation χ is then up-sampled by a decoder DEC component, arranged in series with the encoder ENC, so as to increase the dimension/size of the central representation, so that, eventually, the dimension and/or size of the training output image CR(x) matches the dimension and/or size of the training input image x. The architecture is thus one of an autoencoder.

The lower dimensional and/or smaller sized representation x may also be referred to herein as a "code". The encoder ENC thus "encodes" the received training input imagery x, whilst the decoder DEC is operable to recover or "decode" from that code χ the training output image CR(x), having the same dimension and/or size as the original training input image x. There are also embodiments where the encoder ENC generates code of larger size and/or higher dimension than that of the input image x to foster overcomplete representations. In this alternative embodiment, the encoder ENC may produce the code x at a larger dimension and/or size, but at a higher sparsity. In particular, regularization mechanisms may be used to promote overcomplete and sparse codes, such as described by Freiman, Moti, Ravindra Manjeshwar, and Liran Goshen, in "*Unsupervised abnormality detection through mixed structure regularization (MSR) in deep sparse autoencoders*", published in Medical Physics, vol. 46(5), pp 2223-2231, (2019).

If a neural network set-up is used, as indeed envisaged herein in preferred embodiments, the network CR may be implemented as an auto-encoder neural network as mentioned above.

Optionally, the training data TD may not only include image data but may also include non-image contextual data CXD associated with the respective training images. Contextual data CXD may include the imaging parameters, that is, acquisition and/or reconstruction parameters, as the case may be. If the contextual data is also fed into the training system TS during training, these are optimized alongside the image data. As will be explained more fully below, the non-image contextual data CXD may need to be reshaped by a reshaper module RSH into suitable "pseudo-images" that are then processed alongside their respective training imagery with which they are associated.

If a neural-network set-up is envisaged for contrast reducer CR, deep learning networks are preferred. In embodiments, such deep learning network includes neural networks with one or more (preferably at least two) hidden layers between respective in- and output layers IN, OL as will now be explained more fully with continued reference to FIG. 6.

This block diagram provides more details of the target model CR presented herein as an auto-encoder in a convolutional neuro-network (CNN) set-up with multiscale processing.

The training input data x is processed in a processing path referred to herein as the imaging strand SI. Optionally, if the training is also to include non-image contextual training data CXD, this is processed in a separate processing strand SP including a reshaper RSH. The contextual data CXD may be processed by the reshaper RSH into pseudo-images that are merged with their respective training image data.

However, before explaining the neural network architecture of the target model CR in FIG. 6 in more detail, some artificial neural network concepts are introduced first to facilitate the further description.

Broadly, the NN structure of the target model CR includes a plurality of nodes, at least partly inter-connected and arranged in different layers L. The layers L are arranged in one or more sequences. Each node is an entry capable of assuming a value and/or can produce an output based on input it receives from one or more nodes of an earlier layer L.

Each node is associated with a certain function which can be a simple scalar value (node weight) but can also be with more complex linear or non-linear functions. A "connection" between nodes in two different layers means that the node in the later layer can receive an input from the node in the earlier layer. If there is no connection defined between two nodes, no output of one of the two nodes can be received by the other node as input. The node produces its output by applying its function to the input. This can be implemented as a multiplication of the received input by the scalar value (of weight) of the node. More than one input from different nodes may be received by a node in a later layer. The different inputs may be consolidated by a consolidating function g to produce a consolidated value and it is this consolidated value to which the receiving node applies its own function $f$ to produce the output for the node. For instance, g may map the received inputs from earlier nodes into a sum of products (eg, dot product) and the node's function $f$ may then be applied to said sum of products.

A connection may have its own weight ("connection weight"). The weight is used to weigh output that travels along that connection. The consolidated function may combine all the received input for a given node using the connection weights to produce the consolidated dot product output. The connections between layers may be fixed or may vary during processing. Some layers may be fully connected whilst others may not be. Two layers are fully connected if each node in the later layer is connected with all nodes of the previous layer. In partially connected layers, such as convolutional layers, not all nodes in the later layer are connected to all nodes in the earlier layer.

The outputs of all nodes of a given layer may be referred to herein as the "output of the layer" and the inputs received from an earlier layer may referred to herein as "the input of the layer".

Each layer may be represented as a matrix of two, three or higher dimensions. If the dimension is three or higher, the matrices are commonly referred to as a tensor. The nodes implemented as entries in those matrices or tensors. Each layer has a size (rows i and columns j), a depth k (which may be larger than 1) and possibly further dimensions. Alternatively, the size, depth and the one or more further dimensions may be realized by other data structures than matrices or tensors.

Target model CR in a neuro-network structure includes one or more initial input layers IL and one or more final output layers OL. The initial input layers IL are where the initial training image $\underline{I}$ and, optionally, the contextual data CXD is received, by populating the nodes with values, or by presenting the final result for further processing, respectively.

The layers L, as shown in FIG. 6, are arranged in a deep architecture. The architecture includes one or more hidden layers between the output layer(s) OL and the input layer(s) IL. The number of hidden layers defines the depth of the network M. For instance, a single hidden layer envisaged in some embodiments amounts to a depth of "one". Preferably, however, there are at least two hidden layers used. Preferably, there is an even number of hidden layers, such as 4, 6, or more. The input received from an earlier layer at a hidden layer will be referred to as an intermediate input, whereas the output produced by the hidden layer passed on to a subsequent hidden layer will be referred to as an intermediate output.

In general, in the NN architecture of model CR the training input data IM, such the training input image, is applied as initial input at the one or more input layer(s) IL. The data is then sequentially transformed as the data (image IM or parameter IP) passes through the layers in sequence. At each layer an intermediate output is produced which then serves as intermediate input for the next layer etc., at each instant the respective layer acting of the received intermediate input by applying thereto an operation until a final result emerges at the one or more output layer(s) OL. The NN architecture, envisaged herein is preferably of the feed-forward type where, as described above, the data propagates forward from layer to layer. Alternatively, recurrent architectures may also be envisaged herein, where one or more layers are revisited during processing.

Different types of layers L may have different functions and hence apply different operations. We now turn first to discuss the different types of layers, some or all envisaged herein in different combinations and sub-combinations.

NN layer types envisaged herein include any one or more, or all of the following in combinations: fully connected layers FC, convolution layers C, deconvolution layers D, up-sampling layers ("↑"), down-sampling layers ("↓"), activation layers R as shown in FIG. 3. The layer types are grouped into units to form various operational units, for each scale level s. For example, deconvolution or convolutional layers may be combined with an up-sampling or down sampling layer and an activation layer. For instance, the expression "C, ↓, R" in FIG. 3 indicates a group of layers, arranged in sequence as a convolutional layer C followed by a down-sampling layer ↓, and then by an activation layer R a rectifier unit R. Although grouping layers into such units of 2, 3 or more layers can have implementational advantages when expressed as matrices/tensors and matrix/tensor multiplications, the grouping is not necessarily envisaged in all embodiments.

Turning now in more detail to the activation layer R, this may be implemented using any non-linear function, including logistic-based sigmoid functions, arctan, softmax, rectifier function ($x^+=\max(x,0)$), or others. A layer that implements the rectifier function may be called a rectified linear unit (ReLU). The activation layer R implements a nonlinear function that is applied to the values in each node to introduce a non-linearity to enable the MLC to capture nonlinear pattern. The size of the (intermediate) input layer is preserved by the rectifying layer R. Layer R also serves as an "importance filter" to remove or mitigate an input if this is below a threshold. An input from a node may be completely annulled and hence not forwarded at all to the next layer despite there being a connection. The node is then said not to "fire" and this event is then recorded by forwarding "zero" to the next layer. The proportion of not firing nodes in a given configuration may be expressed as the sparsity of the MLC.

In addition, or instead of ReLUs, drop-out layers may be used in embodiments. These layers also introduce non-linearities by randomly cancelling connections between nodes of two layers.

Turning next to fully connected layers FC, the layers envisaged herein in MLC are not necessarily fully connected although in embodiments the network MLC does include two or more fully connected layers. Fully connected layers are shown as FC in FIG. 6 above. The fully connected layers FC represent more traditional, non-convolution NN components where each node is associated with its activation function and a weight. The activation function for each node may be organized into a separate operational layer. Each node in one layer of the FC receives an input from all nodes in the previous layer each weighted according to the respective weight for the connection, as explained above in the general introduction. This total input is then summed and evaluated by an activation function layer R. The activation function layer is applied to the weight of the respective node to produce a node output which is passed onto nodes in the subsequent layer. The advantage of using FCs are to model more complex, non-linear patterns.

The convolutional layer C and de-convolutional layers D (and/or the up sampling or down sampling layers) are examples of non-fully connected layers. More particularly, these layers are not fully connected to all nodes of the earlier layer. In addition, the connections vary when processing the (intermediate) input from the earlier layer.

In convolution layer C, each node of the intermediate output is obtained by convolving the convolution layer with a sub-group of nodes of the earlier layer, thus involving only a sub-set of all possible connections. The connections are then redefined to single out a new group of nodes for the next intermediate output layer and so on, until the whole (intermediate) input layer has been processed.

The convolutional layers C may be structured as matrices with size preferably odd-numbered, such as 3×3 or 5×5 with a center position. The convolutional/de-convolutional layer may also have a depth that corresponds to that of the depth of the intermediate input to which it should be applied.

The size of the convolutional/de-convolutional layer is in general smaller than the size of the intermediate input on which it acts. Just like in conventional convolution, the convolutional layer may be conceptually thought to slide over its (intermediate) input layer and is applied selectively to different groups of nodes to produce filtered nodes as an (intermediate) outputs. The convolving operation itself may involve forming sums of products between the nodes of the convolution layer and/or all nodes within the instant group in its intermediate input layer. The filtered node is the central node of the odd-sized matrix of the convolutional layer.

The shifting to a new group of nodes in the processing of the convolutional layer may be conceptually understood as a sliding the convolution layer C with stride=n (n being a natural number) over the (intermediate) input to produce the (intermediate) output for each group nodes, respectively. The stride is a design parameter of the CNN that indicates the extent of each shift. For instance, stride n=1 means that the new group is obtained by effectively shifting the layer C by one node when redefining the connections for the next group of node whose values are to be convolved to obtain the value of the next (intermediate) output node. For stride n=2, one column or row of nodes is skipped and accordingly for n>2. It will be understood that, instead of the sliding window approach described above, the input layer to be processed by the convolution layer may be instead broken up open into parts (tiles), and each of these are then convolved with the convolution layer separately.

Zero padding may be used if the convolutional layer extends beyond the outermost nodes of its intermediate input layer on which it acts. The convolutional/de-convolutional layer may be applied in sequence as described or may be applied in parallel in the whole of the intermediate input layer.

The de-convolutional layer D is essentially an inverse operation to the convolution caused by the convolution layer C. Whilst the convolution layer maps, initially, from pixels to features of progressively higher level, the deconvolution operation maps features back down to pixels. Functionally, the deconvolution can be formulated in terms of convolution operations as used in the convolution layer discussed above which are then summed. See for instance section 2 in M D Zeiler et al in "*Adaptive Deconvolutional Networks for Mid and High Level Feature Learning*", 2011 International Conference on Computer Vision, Barcelona, Spain. The de-convolutional layer D may also be represented as a matrix with appropriate depth.

As such, the convolutional and de-convolutional layers do in general preserve the size of their (intermediate) input.

The down-sampling layer is similarly structured as the convolutional/de-convolutional layers C, D, but they act on its input data differently. The down-sampling/up-sampling layer (also referred to herein as simply "down"- or "up-samplers") may be odd- or even-sized. The down sampling layer lumps together a group of nodes in the earlier layer to produce a single node for the subsequent output layer, thus reducing the spatial (less rows and/or columns) of the (intermediate) input layer. This can be done by forming an average or by picking the maximum/minimum value or any other designated value from the group of nodes covered. The size of the group corresponds to the size of the down sampling layer.

The up-sampler acts quasi-inversely to the down-sampler and produces at its output a larger set of nodes, preferably by interpolation between input nodes. Convolution/Deconvolution and the up-sampling/down-sampling functionality may be combined in the same layer. For instance, convolution and down-sampling may be achieved as a convolution with stride >1, such as 2 or larger. In a similar fashion, the deconvolution may be combined with the up-sampling functionality.

Further layer types may include batch normalization layers B. These layers implement a normalization of gradients in the previous layer. This normalization prevents or reduces gradient saturation. In gradient saturation, gradient magnitude reduces too rapidly during iterations. Similar batch normalization layers have been described by Sergey Ioffe et al in "*Batch Normalization: Accelerating Deep Network Training by Reducing Internal Covariate Shift*", available online T arXiv:1502.03167v3 [cs.LG] 2 Mar. 2015.

We will now turn to explaining in more detail the processing of image data in imaging strand SI of target model TM, with continued reference to FIG. 6. In general, in image strand SI, the number of up sampling layers in decoder stage DEC corresponds to the number of down sampling layers in the encoder stage ENC. In one embodiment the encoder ENC of SI includes three down sampling components and the decoder DEC includes three up sampling components. The same may hold true for the convolution/deconvolution layers C, D. In FIG. 6, the layers L are grouped into units.

This grouping is conceptual rather than implementational. The logic of the grouping in FIG. 6 is that each unit causes a down- or upsampling.

Generally, in some embodiments, the last layer L (excluding ReLUs) in encoder ENC is a downsampler ↓ to arrive at the low dimensional representation CR and this is then followed in the decoder section DEC by at least one upsampler t. The last layer downstream layer in the encoder ENC provides the central representation CR in form of a two or higher-dimensional matrix with entries. The more zero or negligible entries there are, the sparser the code CR, and this is preferred. More generally, there is at least one downsampler in the encoder END section, and there is at least one upsampler in the decoder DEC section. This "bottleneck structure" allows implementing the encoding/decoding principle in autoencoder based embodiments of model CR. Alternatively, over-complete variants of the AE architecture are also envisaged herein, where there is not necessarily a spatial down/upsampling, but where instead sparsity-based regularization is used, of which more further below. In alternative embodiments, there is no such bottleneck, but the encoder ENC performs one or more upsampling operations and then the decoder performs a corresponding number of downsampling operations, so as to achieve an over-complete representation where the code CR has a higher spatial dimension than the training input image I and the training output image I'. This autoencoder embodiment with over-complete embodiment is preferably used with sparsity enforcement by regularizer functionality, as will be explained in more detail below.

In addition, there may be at least one convolution layer C in the encoder ENC section and at least one deconvolution layer D in the decoder DEC section. The order of convolution and downsampler in the encoder stage ENC is preferably convolution first and then downsampling but this may not necessarily be so in all embodiments. Similarly, in the decoder DEC section there is deconvolution first and then upsampling although this order too may be reversed in embodiments.

To be sure, the processing sections ENC and DEC are conceptually inverse, but will in general not yield unity, so $ENC^{-1} \neq DEC$.

In embodiments, the encoder ENC of SI includes three-layer units. Each unit comprises, in sequence, a convolution operator followed by another convolution, a down sampling and a rectification R. More or less than three of such units may be used instead in alternative embodiments.

In embodiments, in the decoder section DEC, the convolution layers C have size n×n×d (or larger), preferably each followed by a rectified linear unit (ReLU). The spatial dimension could be any suitable number, such as 3, 5, etc whilst the depth d is a function of color channels (if any) and the number of channels required for the reshaped contextual parameters CXD, as will be explained in more detail below in relation to reshaper strand SP. Two or more convolutions layers C may be used to change scale. The last convolution of each scale may be done with stride 2 for down-sampling/downscaling. In the embodiment of FIG. 3, three feature scales are realized as there are three pairs of up/and down-sampling operations in DEC and ENC, but, in alternative embodiments, more scales, or less scales are also envisaged.

The decoder DEC section of strand SI may complementary mirror the structure of the encoder section ENC and includes correspondingly the same number of units, but in each unit, each occurrence of convolution is replaced by de-convolution layer and each occurrence of a down sampling layer is replaced by an up-sampling layer. The last, down-stream, layer in the decoder DEC preferably ensures that the final output may also allow zero nodes. For otherwise, one is limited to larger than zero values because of the preceding activation layer R. This last layer may be implemented as shown as an additional convolutional layer C to provide the final decoding result, but this may be optional. Preferably, this last convolution has size 1×1×1.

In embodiments, in the decoder DEC 3×3×3 (or larger filters) deconvolution layers D are used, preferably each followed by a rectified linear unit (ReLU). Two or more deconvolution layers D may be used to reverse scales as changed in the encoder ENC. The last deconvolution of each scale is done with stride 2 for up-sampling/upscaling. The number of scales in the decoder section DEC section is usually equal to the number of scales in the encoder ENC section.

Preferably but not necessarily in all embodiments, a typical number of convolution filters in each layer in scale s is $(2^3)^s c$, where s=1, 2, 3, . . . is the scale (the input scale equals 1) and c is a network control parameter, where we found that usually the best performance is obtained in an over-complete setting, in which c>1.

Other combinations or other arrangements of functional layers in the two sections DEC and ENC of the SI are also contemplated herein, but preferably the number of up sampling and down sampling layers and/or the convolution and deconvolution layers in the two sections DEC, ENC are, respectively, the same.

Optionally, some or each of the units may include one or more batch normalizers B arranged between a convolution C or deconvolutional D layer and an activation layer R.

We now turn now in more detail to optional reshaper RSH and the processing of non-image contextual CXD in contextual data processing strand SP, where, for instance, the imaging parameters, acquisition parameters, or patient descriptive data (age, sex, patient history, etc) may be processed. The reshaper strand SP includes, in embodiments, three hidden layers. Specifically, there is envisaged, in sequence, a fully connected layer FC which is followed by a rectification layer R which is in turn followed by a second fully connected layer FC. A single fully connected layer may be used instead, or more than three hidden layers, in particular more than 2 FCs, may be used.

Functionally, the imaging parameter strand SI is configured to act as a re-shaper of the set of imaging parameters. In other words, at output OL of strand SP a "pseudo-image" is formed based on the contextual date CXD received at its input layer IL. The imaging parameters are reformatted into a matrix/tensor with size equaling the input image IM. This pseudo-image is then merged as indicated by arrow $f_L$ (or "feedline") with the initial image data IM received at the input layer IL of the SI strand.

Convolutional layers have a certain depth and can act on a multi-dimensional layer. The depth of convolution may correspond to the number of channels of the imagery to be processed. For instance, a convolutional layer applied to a color image may have a depth of three so as to serve each of the three color channels RGB. The convolution operations in each of the three layers may be different for each channel.

In embodiments, it is proposed herein to include the reshaped image parameters (that is, the pseudo image) as additional channels into the training input imagery I and to configure the convolutional/de-convolutional layers in the SI section to have an additional depth that is configured to process the pseudo-image that is the reshaped image parameters. In this sense the imaging parameters and the actual image data in I are merged into a multi-dimensional compounded image where the imaging parameters are included as an additional dimension or layer into the actual image data. This allows the compounded image to be processed by multi-channel convolutional/de-convolutional layers whose depth corresponds to the actual dimensions of the image data I, plus one (or more) dimension(s) for the imaging parameters Ip.

In embodiments, the reshaper RSH reshapes the output of the last fully connected layer FC to a representation of one or more matrices or volumes or tensors, which may be called herein an "imaging parameter volume" or "pseudo-image". The size of each imaging parameter volume equals the size of the input image I. The imaging parameter volumes are fed in additional channel(s) to the imaging strand IS. The number of additional channels corresponds to the number of imaging parameter volumes produced by the reshaper strand SP. The feeding-in into the image strand SI may be done by populating each output value of the last fully connected layer FC to a separate imaging parameter volume, where in each case, the respective entire volume is filled-up by the same output value. Other embodiments of merging image data V with non-image data CXD are also envisaged. Using the above described multi-channel technology in the context of CNNs is merely one embodiment. However, similar applications of the above merging technique in more general NN or non-NN contexts are also envisaged herein.

The imaging parameters, as applied to the input layer of reshaper strand SP, may be represented in one or many more dimensions. The imaging parameters are preferably encoded in a suitable numeric format or may be so mapped from classes to numeric values. The imaging parameters provided as one or more vectors or matrices at the input layer IL in strand SP of network CR. the dimension of the vector or matrix, or indeed tensor in general equals that of the image data IM.

A similar architecture as shown in FIG. 6 may also be used for the contrast booster CB=G2.

As mentioned earlier, NNs are not a necessary requirement herein. For example, DS may be implemented as a support vector machine SVM, or a k-nearest neighbor scheme, or as any other classifier setup, such as decision trees or random forest, etc. the two generators may be implemented as different NNs, or one as an NN and the other as a non-NN model. Non-NN type ML models for either one or both of generators G1, G2 envisaged herein include variational Autoencoders, Boltzmann machines, Bayesian Networks, and others.

Figure 7:
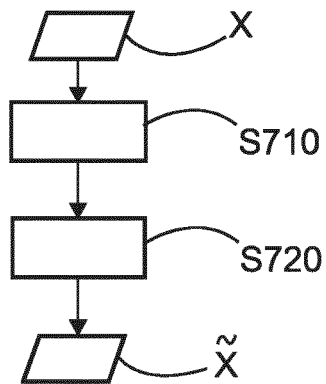
FIG. 7 shows a flow chart of a computer-implemented method for IQ enhancement.

Reference is now made to FIG. 7 which shows a flow chart of a computer implemented method for image enhancement. The method is based on machine learning model G1=CR as trained by any one of the above described training systems TS, based on the at least two-category image training data set TD. A GAN setup may be used, but this is not a necessity herein.

At step S710, a new image (not part of the data set TD) is supplied to the pre-trained machine learning model. The new image X may have been acquired for example by an x-ray imaging apparatus. Preferably, the image X has been acquired whilst contrast agent (previously administered to the patient) was present in the field of view (FOV) of the X-ray imaging apparatus.

The machine learning model CR, CB processes the supplied image X to compute at step S720 an IQ enhanced image $\tilde{X}$, such as a contrast enhanced image $\tilde{X}$. The contrast enhanced image $\tilde{X}$ is output. The contrast enhanced image $\tilde{X}$ may be displayed on a display device, stored or otherwise processed.

In particular, contrast in the enhanced image $\tilde{X}$ is higher than in the input image X. In embodiments, the pre-trained machine learning model comprises two parts, a machine learning stage and an analytical stage. The parts operate in sequence. The machine learning stage may include the above described trained contrast reducer CR,G1, followed by the analytical stage, such as the above described contrast booster CB. The contrast reducer CR, G1 initially reduces the contrast of the input image X to produce a contrast reduced image. Based on the initial image and the contrast reduced image, a contrast distribution at a level already present in the input image is estimated. The so estimated contrast is then amplified ("boosted") linearly or non-linearly by the contrast booster CB. In linearly acting embodiments, the contrast booster CB may be configured to include an amplifier factor $\beta$, which is multiplicatively and point-wise applied to the contrast estimate. The so amplified contrast is then added to the original input image X to obtain the contrast enhanced image $\tilde{X}$. The amplifier or boost factor $\beta$ may be fixed or may be user adjustable.

As a result of the operation of the machine learning model, the enhanced contrast in the contrast enhanced image $\tilde{X}$ is not global, but is locally focused. Specifically, the contrast enhancement is more prominent in image portions that already represent contrast agent. The enhancing operation at step S720 of the machine learning model is thus to increase contrast only in those one or more regions that represent contrast. Other image regions are left unchanged (within an applicable margin), or, if contrast is still enhanced in such regions, this is done so to a lesser extent than in the contrast representing regions of the input image X.

The above described locally focused contrast enhancement is at least in parts due to the manner in which the machine learning part CR has been trained which included use of the cycle consistency checker function as part of the objective function to control the training. A similar, locally acting enhancement may be obtained for other IQ metrics, such as artifact or noise.

In case X happens to be an input image acquired whilst there is no contrast agent/medium present in the FOV, or, if the amount/concentration is below a threshold, the output image $\tilde{X}$ is essentially a copy of the input image X. The processing strep is hence asymmetric with respect to the IQ of the input image.

Figure 8:
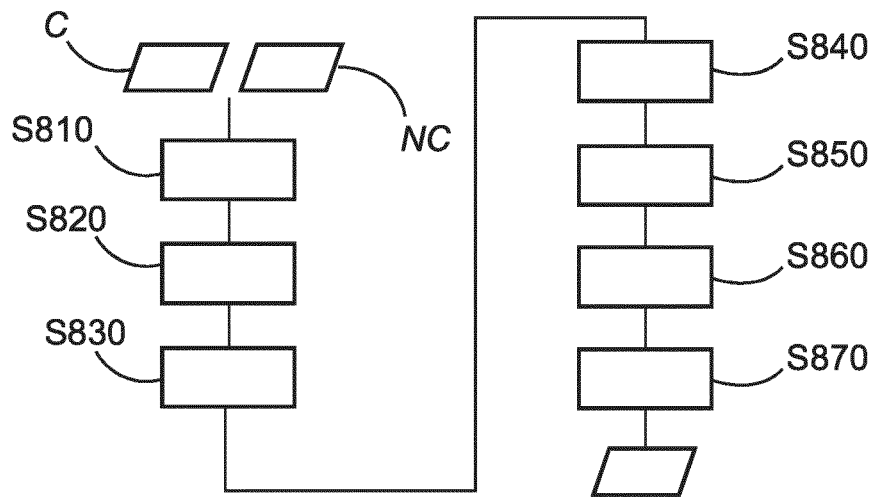
FIG. 8 shows a flow chart of a computer-implemented method of training a machine learning model.

Reference is now made to FIG. 8 which shows a flow chart of a computer-implemented method of training a target machine learning model CR,G1 in the training system TS framework as described above. The framework comprises plural ML models. The following steps of the method involve computing training output images using the models. Based on the training output images, an objective function is improved in an optimization procedure by adjusting a current (or initial) set of parameters in one or more iterations. The below mentioned ML models are assumed to have an initial or current set of parameters. If the models are neural network-type models, the said parameters includes weights of the network nodes in the various layers and/or filter elements in case of convolutional type networks (CNN), for example as discussed above at FIG. 6.

At step S810, an initial training image is drawn from a training data set. The set includes at least two classes of images, contrasted and non-contrasted images as described above.

Assuming first that a contrasted image Ī is received/drawn at step S810, this is processed at step S820 by a first machine learning model. The first machine learning model produces a first training output image I. In general, the first machine learning model is configured during the training to act on the input image to produce the first training output image I with reduced contrast as compared to the contrast in the initial training input image Ĩ.

In embodiments, the first machine learning ("ML") model is of the generative type. It is preferably but optionally part of a GAN network, which in turn forms part of the (global) training system frame TS as described above, including multiple ML models. The GAN network includes, in addition to the first ML model, another machine learning model, preferably a model DS of the discriminator-type.

The discriminator model DS at optional step S830 processes the first training output image I to compute a classification result that represents a classification attempt to classify the output image into one of high or low contrast. In other words, the classification step at S830 is such so as to discriminate whether the training output image was (artificially) generated by the first ML model, or whether it was drawn from the low contrast category of the initial training data set.

At step S840, contrast in the contrast reduced training output image I is increased again to produce a second training output image Ĩ. This contrast increasing/contrast boosting operation at step S840 is based in particular on the contrast reduced image I and the initial high contrast image as drawn at step S810. A scaling factor may be used in the contrast increasing/contrast boosting operation S840. In particular, the initial input image and the first output image are linearly combined using one or more such scaling factors. A weighted sum may be used. Yet more particularly, and in embodiments, a "base contrast" is estimated in step S840 by subtracting the initial input image from the first output image. The base contrast is then boosted by multiplication with the scale factor and the scaled result is then added to the initial input image. Ideally, the "base contrast" represents the native contrast that is present/encoded in the given image. The base contrast is the part of the image information (as encoded in the image I) that was caused, up to noise, by the amount/concentration of contrast agent that was present in the FOV of the imager IA, when the said image was acquired.

The so contrast enhanced Ĩ image is then again contrast reduced at step S850 using a third ML model, in an attempt to replicate the initial contrasted image that was drawn in at step S810. This third ML model is preferably also of the generative type, so that the ML framework of the training system for the proposed training method includes two ML models of the generative type.

At step S860 parameters of the two or three machine learning models mentioned above are adjusted so as to improve the objective function (or a system of cost functions). Values of the objective function depend on the training output images obtained above and, if applicable, the current classification result. Again, the discriminator model DS is optional.

The above steps S810-S860 are repeated in one or more iterations for one or more initial training images drawn in at step S810, to obtain optionally new classification results and new training output images. The cost function is dependent on the optional newly obtained classification results and new training output images and is further dependent on the optional earlier classification results and earlier training output images. Specially, if the objective function is a cost function, the accumulated costs are taken into account for all previous or one or more training input images. The training input images can be drawn and processed one-by-one, or in subsets from the initial training data set. The subsets are sometimes referred to as batches.

After a certain number of iterations and after having processed plural such initial training input images, training concludes. Training concludes when a stopping condition is fulfilled. The stopping condition may be a user issued signal, a pre-set number of iterations, once all or a certain fraction of training images in the set have been processed, or once a sufficient degree of convergence in the ML parameters has been detected. Once training concluded, the first ML model G1, CR is made available at follow-up step S870 as part of the trained model for contrast enhancing system, which may then be used during deployment. The trained ML model for image enhancement further includes an analytical post-processing stage, including a fixed or user adjustable contrast booster parameter, as used to implement step S840 in deployment.

So that the above described ML components for the classification operation S830 and the two contrast reductions S820, S850 can operate as intended, its parameters are adjusted at step S860 in one or more iterations and for plural initial training input images. Gradient-based methods, such as forward-backward propagation techniques for NN-type ML models, may be used where the training controller TC evaluates a gradient of the objective function. As mentioned earlier, it is assumed herein that the objective function is a cost function, and the improving of the objective function is a reduction of cost. However, this does not limit in any way what is described herein, as the principles of operation are readily applicable for utility functions also, where the improvement is one of increasing or maximization of utility, rather than reducing or minimizing the cost.

The cost returned by the cost function is based i) optionally on the classification result computed at step S830 and ii) a deviation between the initially drawn in low/high contrast image at step S810 and the second training output image produced at the restoring step S850. A lower cost is incurred if the said deviation is small. In respect of the optional discriminator, the cost function is configured (as will be described in more detail below) to award lower cost if the optional classification result is correct. At the same time, and adversarial to the awarded cost at i) above in respect to the correct classification result, the cost function (or another cost function in the system of cost functions), awards lower costs if the first ML model manages to produce the contrast reduced first output image to lead to an incorrect classification result by discriminator. These two adversarial objective have been shown to converge during the iterations towards a game-theoretic equilibrium.

Once a sufficient degree of convergence of the parameters of the ML models involved has been achieved, the system TS behaves asymmetrically in respect of training images from the two categories, contrasted and non-contrasted. Specifically, if at step S810 a low contrast initial training input image is drawn in, this is essentially kept undisturbed as the image passes through the above described processing steps S810-S850. In particular, the second training output image output at step S860 is in approximation a copy of the initial input image. The case is different for a high contrast image which undergoes two cycles of contrast reduction, with a contrast boost inbetween, and yet the second training output image output at step S860 is still expected to be an approximate copy of the initial input image. The training system thus maintains low contrast input imagery, and restores (despite the said contrast changes in the cycles) high contrast input imagery. This asymmetric behavior of the training system TS is enforced in particular by the above mentioned cycle constancy checker cost function CC( ).

It is in particular this up- and down cycle in respect of contrast enhanced input imagery that allows the system TS to better learn true contrast differences and thus producing a machine learning model that is geared to contrast enhance only portions of the image that represent the presence of contrast agent.

The above described cost function (or system of cost functions) as implemented by the training controller TC as discussed in more detail below. The training controller TC may be implemented in software or hardware, or partly in both.

As mentioned earlier, the training system TS may use a system of cost functions. Specifically, the machine learning, that is, the adjusting of the ML parameters, is controlled by training controller TC based on the cost function. The cost function is a scalar function that maps the parameters to be learned to a number, "the cost". Broadly, the controller TC adjusts the parameters of some or all of the ML models, so that the cost is reduced. This operation is referred to herein as "improving the cost function". If the optimization is formulated in terms of a utility function as objective function, this is improved by increasing the utility as function of ML parameter adjustment.

Some or each cost function may itself comprise sub-cost function components. The sub-cost function components may be combined, for example additively, to yield the respective (super-)cost function. The sub-cost functions may thus be understood as terms of the (super-) cost function. However, each sub-cost function is a cost function in its own right, and for present purposes it is equivalent to formulate a single optimization (minimization) in terms of the single super-cost function, or a system of optimizations comprising respective (partial) optimization for each sub-cost function.

In the following, when we refer to "the/a cost function", this may be part of the system of cost functions that are together used to enforce the above described behavior of the training system in respect of the inputs and outputs produced by the framework of ML models in the training system. Thus, a reference herein to "the cost" function is thus not at the exclusion of other cost functions that are used in addition in the training system. In general a cost function uses a suitable distance/deviation measure L( ) that measures a relationship (eg, a similarity) between input imagery and output imagery. "Input" and "output" as used herein not only refer to the initial input (image) and final output (image) of the training system TS, but also to the various intermediate input/output imagery that is/are produced as data passes through the various stages of the training system TS as described above at FIGS. 2-8. Terms of a cost function may be referred to herein as regularizers, optionally envisaged herein, to enforce certain desirable properties of the parameters or of results obtainable from such parameters.

Cost functions can be distinguished between those (mainly) operating in respect of the contrast reducer (the first generator G1), the optional discriminator DS, and the restorer RS (the second generator G2). However, it should be understood that some or all of the cost functions as used herein are interdependent and are optimized jointly, either at once or in turn in by alternating as discussed below. Cost functions may not only be formulated in terms of output/input imagery, but also in terms of the parameters of the (at least) three ML models. Thus, a cost function for one ML model may also refer to parameters of the other (at least two) ML models, thereby causing the mentioned interdependence. The cost function system E for training system TS as implemented by training controller TC may be denoted herein as $E=(E_{G1}, E_{DS}, E_{G2})$. In embodiments, the proposed optimization includes both, minimization and maximization.

Turning now first to the cost function EG, of the first generator G1, this includes optionally a GAN term that represents the adversarial relationship between the first generator and the discriminator. In addition or instead, there is a (further) cost function, the consistency checker function CC( ). Combining the two cost functions for generator $G1=G_{\bar{I} \to I}$ into one (super-)cost function, this cost function may be formally written as the following minimization task:

$$\min_{\theta_{G_{\bar{I} \to I}}} E_{G1}\left(\theta_{G_{\bar{I} \to I}}, \bar{I}, I\right) = \qquad (1)$$

$$\sum_{i=1}^{n}\left(\log(1 - DS(G_{\bar{I} \to I}(\bar{I}_i))) + + \lambda_1 CC(\bar{I}_i) + \lambda_2 CC(I_i)\right)$$

wherein $\theta_{G_{\bar{I} \to I}}$ represents the parameters of first generator $G=G_{\bar{I} \to I}$, and the summation in (1) (and also in the following equations) is over the training input imagery $x=\bar{I}$, I of training set TD. In eq(1) and below, the $\lambda_i$'s are optional control parameters that can be used to adjust the contribution of each term in the optimization. These control parameters are in general meta-parameters and are not adjusted in the optimization so are not learned. Some or all $\lambda_i$'s may be unity.

Turning now first to the cycle consistency checker cost function CC( ) in more detail, this operates on contrasted images and non-contrasted images to enforce the above described behavior for the training systems to globally act on images from both classes as the identity operator.

The cycle consistency checker cost function may be written as:

$$CC(x) = L(G_{\bar{I} \to I}(x + \propto M(x)) - x) \qquad (2a)$$

$$M(x) = x - G_{\bar{I} \to I}(x) \qquad (2b)$$

M is the contrast agent contribution measure, and x is an image from either class C,NC. "∝" is the earlier mentioned contrast scaling/boost factor, a positive number, preferably >1. The scaling factor can be adjusted as mentioned by the user, but remains preferably fixed during training. The scaling factor may be changed during deployment to values β other than the one ∝ used for training, so that user can adjust (eg, by the user interface UI) the strength of the contrast boost. L(•) is the above mentioned similarity measure, e.g., $L_1$-norm or the squared $L_2$-norm cost functions, or the sum of both of them, or a weighted sum, or other.

By minimizing (2a), the cost function E incurs smaller cost for a small deviation between output of restorer $G2=G_{I \to \bar{I}}$ and the initial input x. In this way, the training system has its parameters adjusted in the optimization so as to the approximate the identity operator behavior for imagery from both classes.

The cost function $E_{G1}$, thanks to regularizer or cost function term CC, thus measures the deviation between the restored image $G_{I \to \bar{I}}$ (x) and the initial input image x, for images from either image class, contrasted and non-contrasted. A small deviation attracts small costs.

The cost function $E_{G1}$ in (1) may include additional, optional, cost (partial) function or regularizer terms (summands). Some such additional terms are described below at eq. (3)-(5) and represent prior knowledge and expectations for the contrast map M. the regulizers (3)-(5), singly or in combination, yet further improve the above described locally focused IQ enhancement, such as contrast increase.

For example, a regularizer term for the map M may be configured to promote solutions with low noise and/or roughness as expressed by:—

$$\lambda_3 N_{map} R(M(\bar{I}_i)^+) \quad (3)$$

wherein $(\bullet)^+$ is a rectifier function (defined as the positive part of its argument); $N_{map}$ is a noise map of I, computed based on standard deviation or variance map in patches for some r each pixel, which can be generated using several approaches, e.g., as described in Applicant's U.S. Pat. No. 8,938,110 or U.S. Pat. No. 1,028,282; $R(\bullet)$ is a roughness penalty or regularization term (e.g., total variation, Huber loss function or any other suitable measure). Term (3) or any other such similar term promotes piece-wise smooth solutions of the contrast agent map $M(\bar{I}_i)^+$ (such as an Iodine map) which represents the contrast medium/agent contribution or part in the image as explained above at eq (2b).

Another optional regularizer term to be included in (1) as an additional term is:—

$$\lambda_4 L((-M(\bar{I}_i))^+) \quad (4)$$

This term promotes positive ($\geq 0$) contrast agent maps as adding contrast to the image could only increase the intensity/HU (this is true up to image artifacts). Negative contributions as per the map are unrealistic and term (4) or similar terms regularizes/encourages computing positive maps during the optimization.

Another optional regularizer term to be included in (1) as an additional term is:—

$$\lambda_5 L(M(I_i)) \quad (5)$$

This term promotes solutions with low contrast maps M for non-contrasted input images I as such images are assumed to have been acquired with no contrast agent present in the FOV. The cost function E may include all term (3)-(5), only single or, or any (sub-)combination of eq (3)-(5).

Turning now in more detail to the optional GAN setup, this may require two cost functions to formulate the adversarial relationship between G1 and D as a min-max optimization.

One of the terms, the one for the first generator G1, is formulated in (1) as $\log(1-DS(G_{\bar{I} \to I}(I_i)))$ and is configured to incur higher costs if the first generator G1 does not succeed in producing an output that results in the discriminator DS producing a false classification result. Specifically, the minimization task for the cost function of the first generator G1 is to minimize the logarithm of the inverse probability predicted by the discriminator for fake images. The generator thus tends to generate samples that have low probability of being a fake image.

The other GAN cost function $E_{DS}$, the one for the discriminator DS, may be configured as follows:

$$\max_{\theta_{DS}} E_{Ds}(\theta_{DS}, \bar{I}, I) = \sum_{i=1}^{n}(\log(DS(I_i)) + \log(1 - DS(G_{\bar{I} \to I}(\bar{I}_i)))) \quad (6)$$

(6) is formulated as a binary classification in terms of cross entropy. This cost function is configured to incur higher costs if the discriminator does not correctly classify the imagery I as output by generator $G1=G_{\bar{I} \to I}$. Thus, the discriminator objective function, a utility function rather than a cost function, is configured to maximize an average of the log probability of genuine images and the logarithm of inverse probabilities for fake images.

Other formulations for the GAN setup than (1), (6) are also envisaged, such as a least squares GAN cost function or Wasserstein GAN cost functions, all envisaged herein in alternative embodiments. The GAN setup, whilst preferred herein for its robustness, is not a necessity herein. If no GAN step is used, the cost function eq (6) is not required and neither is the $\log(1-DS(G_{\bar{I} \to I}(I_i)))$ term in cost function eq (1). In this case, first generator G1 can be any generative network suitably trainable to generate IQ reduced samples from the training data set in the (at least two) image categories C, NC.

Turning now to the cost function $E_{G2}$ of the restorer RS network, the second generator G2, this can be configured in terms of the cycle consistency regularizer CC ( ) as follows:—

$$\min_{\theta_{G_{\bar{I} \to I}}} E_{G2}(\theta_{G_{\bar{I} \to I}}, \bar{I}, I) = \quad (7)$$

$$\sum_{i=1}^{n}(\lambda_6 L(G_{\bar{I} \to I}(\bar{I}_i + \propto M(\bar{I}_i)) - \bar{I}_i) + \lambda_7 L(G_{\bar{I} \to I}(I_i + \propto M(I_i)) - I_i)) =$$

$$\sum_{i=1}^{n}(\lambda_6 CC(\bar{I}_i) + \lambda_7 CC(I_i))$$

This cost function, similar to (1), encourages the identity operator behavior for the restorer G2 when acting on images from both classes C,NC.

This optimization in respect of objective function (system) $E=(E_{G1}, E_{DS}, E_{G2})$ eq (1), (6) and (7) may be done using an alternate optimization procedure. In this scheme, the optimization alternates between performing an optimization step of each of two or three cost functions, i.e., cost function of networks $G1=G_{\bar{I} \to I}$, and $G2=G_{\bar{I} \to I}$ (and optionally discriminator DS, if present) in turn, whilst treating parameters of the other two models as constants. Some or each step of the alternate optimization procedure could be gradient-based as mentioned earlier. Envisaged approaches include stochastic gradient descent. See for example H Robbins et al "A stochastic approximation method", publ. Ann Math Stat. 22, pp 400-407 (1951), or the "ADAM" algorithm by D P Kingma, et al, "A method for stochastic optimization", published as an arXiv pre-print at arXiv: 1412.6980 (2014). Other optimization algorithms such as conjugate gradients, or Nelder-Mead, or even non-gradient based are also envisaged herein in embodiments.

Whilst the above learning task has been formulated as an optimization problem controlled by the cost function E, "optimization" as used herein does not necessarily mean that a global optimum is found. A local optimum may be sufficient for most applications. Even when the proposed algorithm does converge to a local (or global) optimum it is not necessarily required herein that this is actually attained. An approximation within a pre-defined error bound will be sufficient for most applications. Iterations may be aborted earlier when there are no appreciable changes in the ML parameters.

In addition, the training could be further improved or boosted by using the mixed structure regularization or auto-mixing method, as described for example by M Freiman et al, "*Unsupervised abnormality detection through mixed structure regularization (MSR) in deep sparse autoencoders*", publ. Medical Physics vol 46(5), pp 2223-2231 (2019). Specially, non-contrast images contrasted images may be so mixed.

In addition to the producing contrast boosted images, the proposed method could also provide additional usefully results, including virtually non-contrasted (VNC) images. For example, the output of network $G1=CR=G_{7 \to f}$, could be used to calculate an contrast agent-map, as $M(x)=G_{7 \to f}(x)-x$.

Whilst the above described training system TS and contrast enhancer SIE (FIG. 5) have been described for image contrast enhancement, the described principles are of equal application to other type of image quality (IQ) enhancements, including artifact and noise reduction. Thus, the above can be readily extended to other types of IQs, the two categories of imagery in the training set TD being now two classes of high and low quality imagery: for example, imagery with low artifact contribution or low noise on the one hand for high IQ specimens, and imagery with high artifact contribution or high noise for low IQ specimens on the other hand, etc. For example, for IQ in relation to artifacts, the first Generator G1 operates in this embodiment to increase artifact contribution, whilst for IQ in relation to noise, the first generator G1 is to increase noise, etc. In such IQ embodiments other than contrast, the measure function M of cycle consistency checker CC( ) is configured to measure local noise, such as by standard deviations per pixel neighborhood. Other noise filters may be used. As to IQ in terms of artifact presence, the measure function M may be configured as a filter in spatial or frequency domain with high response tuned to specific artifact image pattern of interest, such as cupped artifacts, rings, streaks, etc.

The qualifiers "high"/"low" as used herein indicate that a given IQ is better in a given high IQ image specimen than it is in a low IQ image specimen.

One or more features disclosed herein may be configured or implemented as/with circuitry encoded within a computer-readable medium, and/or combinations thereof. Circuitry may include discrete and/or integrated circuitry, application specific integrated circuitry (ASIC), a system-on-a-chip (SOC), and combinations thereof, a machine, a computer system, a processor and memory, a computer program.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium (in particular, but not necessarily, a non-transitory medium), such as an optical storage medium or a solid-state medium supplied together with or as part of other hardware, but may also be distributed in other forms, such as via the internet or other wired or wireless telecommunication systems.

However, the computer program may also be presented over a model like the World Wide Web and can be downloaded into the working memory of a data processor from such a model. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A training system (TS) for training a target machine learning model for image enhancement of medical imagery, comprising:

an input interface configured to receive a training input image drawn from a training data set including at least two types of training imagery comprising a high image quality (IQ) type and a low IQ type, the training input image being the high IQ type;

a machine learning model framework including a first generative network and a second generative network, wherein the target machine learning model comprises the first generator network, wherein the first generative network processes the training input image of the high IQ type to produce a training output image having a reduced IQ, and the target machine learning model produces, based on the training output image and the training input image of the high IQ type, a second training output image, with the second generator network operable to estimate, from the second training output image, an estimate of the training input image of the high IQ type; and a training controller configured to adjust at least one parameter of the machine learning model framework-based on at least a deviation between the estimate of the training input image of the high IQ type and the training input image of the high IQ type.

2. The system of claim 1, wherein the machine learning model framework includes a sub-network of the generative adversarial type including the first generative network and a discriminator;

wherein the discriminator is configured to attempt discriminating between a training input of the low IQ type drawn from the set and the training output image to produce a discrimination result;

and wherein the training controller is configured to adjust parameters of the machine learning model framework further based on the discrimination result.

3. The system of claim 1, wherein the training input imagery is processed alongside contextual data that describe at least one of: i) at least one image acquisition parameter, ii) at least one reconstruction parameter, and iii) patient data.

4. The system of claim 1, wherein an architecture of the first generative network and/or the second generative network is a convolutional type.

5. The system of claim 1, wherein an architecture of the first generative network and/or the second generative network is a multi-scale type.

6. The system of claim 1, wherein the IQ comprises at least one of: i) a contrast level, ii) an artifact level, and iii) a noise level.

7. The system of claim 1, wherein the high IQ is imagery recorded by an imaging apparatus while a contrast agent is present, and the low IQ is imagery recorded by the apparatus while a smaller amount of the contrast agent is present.

8. The system of claim 1, wherein the imagery of the high IQ and the low IQ in the set is X-ray imagery or MRI imagery.

9. The system of claim 8, wherein the imagery of the high IQ and the low IQ is computed tomography imagery.

10. A computer-implemented method of training a target machine learning model for image enhancement of medical imagery, comprising:

receiving a training input image drawn from a training data set including at least two types of training imagery comprising a high image quality (IQ) type and a low IQ type, the training input image being the high IQ type;

processing, by a first generative network, the training input image of the high IQ type to produce a training output image having reduced IQ, wherein the first generative network is part of a machine learning model framework further including a second generative network, wherein the target machine learning model comprises the first generative network;

processing, by the target machine learning model, the training output image and the training input image of the high IQ type, to produce a second output image;

estimating, by the second generative network, from the second output image, an estimate of the training input image of the high IQ type; and adjusting, by a training controller, at least one parameter of the machine learning model framework based on at least a deviation between the estimate of the training input image of the high IQ type and the training input image of the high IQ type.

11. A non-transitory computer-readable medium for storing executable instructions, which cause a method to be performed to train a target machine learning model for image enhancement of medical imagery, the method comprising:

receiving a training input image drawn from a training data set including at least two types of training imagery comprising a high image quality (IQ) type and a low IQ type, the training input image being the high IQ type;

processing, by a first generative network, the training input image of the high IQ type to produce a training output image having reduced IQ, wherein the first generative network is part of a machine learning model framework further including a second generative network, wherein the target machine learning model comprises the first generative network;

processing, by the target machine learning model, the training output image and the training input image of the high IQ type to produce a second output image;

estimating, by the second generative network, from the second output image an estimate of the training input image of the high IQ type; and adjusting, by a training controller, at least one parameter of the machine learning model framework based on at least a deviation between the estimate of the training input image of the high IQ type and the training input image of the high IQ type.

* * * * *